(12) United States Patent
Noma et al.

(10) Patent No.: US 10,134,176 B2
(45) Date of Patent: Nov. 20, 2018

(54) SETTING A PROJECTIVE POINT FOR PROJECTING A VECTOR TO A HIGHER DIMENSIONAL SPHERE

(71) Applicant: FUJITSU LIMITED, Kawasaki-shi, Kanagawa (JP)

(72) Inventors: Yui Noma, Kawasaki (JP); Makiko Konoshima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 317 days.

(21) Appl. No.: 14/569,162

(22) Filed: Dec. 12, 2014

(65) Prior Publication Data

US 2015/0254890 A1   Sep. 10, 2015

(30) Foreign Application Priority Data

Mar. 7, 2014   (JP) ................................ 2014-045575

(51) Int. Cl.
*G06T 15/10* (2011.01)
*H04L 9/06* (2006.01)
*H04L 9/32* (2006.01)
*G06N 99/00* (2010.01)
*G06N 7/00* (2006.01)

(52) U.S. Cl.
CPC ........... *G06T 15/10* (2013.01); *G06N 99/005* (2013.01); *H04L 9/0643* (2013.01); *H04L 9/3231* (2013.01); *G06N 7/005* (2013.01)

(58) Field of Classification Search
CPC ...... G06T 15/10; G06N 99/005; G06N 7/005; H04L 9/3231; H04L 9/0643
See application file for complete search history.

(56) References Cited

U.S. PATENT DOCUMENTS

| 5,014,327 A * | 5/1991 | Potter ................. G06K 9/6276 382/218 |
| 5,276,771 A * | 1/1994 | Manukian .............. G06K 9/627 706/17 |
| 2005/0209786 A1* | 9/2005 | Chen ....................... G06F 19/24 702/20 |
| 2011/0096955 A1* | 4/2011 | Voloshynovskiy ...... G06K 9/00 382/103 |

FOREIGN PATENT DOCUMENTS

| JP | 10-247243 | 9/1998 |
| JP | 2009-133798 | 6/2009 |

OTHER PUBLICATIONS

Korean Office Action dated Dec. 30, 2015 for corresponding Korean Patent Application No. 10-2015-0013498, with Partial English Translation, 8 pages.

(Continued)

*Primary Examiner* — Maurice L. McDowell, Jr.
(74) *Attorney, Agent, or Firm* — Fujitsu Patent Center

(57) ABSTRACT

A classification method includes: setting a position of a projective point based on information on a domain of definition of a feature value space, using a processor; and projecting a vector present in the feature value space to a sphere present in a space of dimensions higher by at least one dimension than a dimension of the feature value space by using the set position of the projective point, using the processor.

10 Claims, 20 Drawing Sheets

(56) References Cited

OTHER PUBLICATIONS

Extended European Search Report dated Aug. 5, 2015 for corresponding European Patent Application No. 14198211.6, 5 pages.
Terasawa, Kengo et al., "Approximate Nearest Neighbor Search for a Dataset of Normalized Vectors," IEICE Transactions on Information and Systems, vol. E92-D, No. 9, pp. 1609-1619, Sep. 1, 2009, XP055190861.
Noma, Yui et al., "Markov Chain Monte Carlo for Arrangement of Hyperplanes in Locality-Sensitive Hashing," Journal of Information Processing, vol. 22, No. 1, pp. 1-13, Mar. 18, 2013, XP055191518.
Mayur Datar et al., "Locality-Sensitive Hashing Scheme Based on p-Stable Distributions", Proceedings of the Twentieth Annual Symposium on Computational Geometry (SCG), Jun. 9-11, 2004, pp. 253-262 (10 pages).
Jae-Pil HEO et al., "Spherical Hashing", In CVPR, 2012, pp. 2957-2964 (8 pages).
Kengo Terasawa et al., "Spherical LSH for Approximate Nearest Neighbor Search on Unit Hypersphere", WADS, vol. 4619 of Lecture Notes in Computer Science, Springer, 2007, pp. 27-38 (12 pages).
Chinese Office Action dated Apr. 12, 2017 for corresponding Chinese Patent Application No. 201510040744.0, with English Translation, 13 pages.

\* cited by examiner

| IDENTIFICATION INFORMATION | FEATURE VALUE VECTOR | ~122 |
|---|---|---|
| 1001 | (A1, A2, ···, Am) | |
| 1002 | (B1, B2, ···, Bm) | |
| ··· | | |

| IDENTIFICATION INFORMATION | BIT STRING | ~132 |
|---|---|---|
| 1001 | 10001010101··· | |
| 1002 | 00001110101··· | |
| ··· | | |

SETTING A PROJECTIVE POINT FOR PROJECTING A VECTOR TO A HIGHER DIMENSIONAL SPHERE

CROSS-REFERENCE TO RELATED APPLICATION

This application is based upon and claims the benefit of priority of the prior Japanese Patent Application No. 2014-045575, filed on Mar. 7, 2014, the entire contents of which are incorporated herein by reference.

FIELD

The embodiments discussed herein are related to, for example, a method for classification.

BACKGROUND

For example, to authenticate users, various systems acquire biological information of each of the users, and determine whether biological information agreeing with the acquired biological information is present in a pre-registered database. The biological information acquired at the time of the authentication rarely completely agrees with the biological information acquired at the time of the registration, so that similarity search is effective.

Techniques have been developed in which, when the similarity search is performed, feature values of biological information are converted into hash vectors as an expression of a degree of similarity, and pieces of the biological information are identified as similar pieces of biological information when the Hamming distance between the hash vectors thereof is small.

Some related techniques employ processing of converting the feature values into the hash vectors using a hyperplane while other related techniques employ processing of converting the feature values into the hash vectors using a hypersphere, which is more likely to improve accuracy than using the hyperplane.

Conventional technologies are described, for example, in the following patent documents:

Japanese Laid-open Patent Publication No. 10-247243; and

Japanese Laid-open Patent Publication No. 2009-133798.

Some other related technologies are described, for example, in the following non-patent documents:

M. Datar, N. Immorlica, P. Indyk, V. S. Mirrokni, "Locality-Sensitive Hashing Scheme Based on p-Stable Distributions", *Proceedings of the Twentieth Annual Symposium on Computational Geometry*, SCG 2004;

Jae-Pil Heo, Youngwoon Lee, Junfeng He, Shih-Fu Chang, and Sung-Eui Yoon, "Spherical Hashing", In CVPR, pp. 2957-2964, 2012; and Kengo Terasawa and Yuzuru Tanaka, "Spherical LSH for Approximate Nearest Neighbor Search on Unit Hypersphere", In Frank K. H. A. Dehne, Jorg-Rudiger Sack, and Norbert Zeh, editors, WADS, Vol. 4619 of *Lecture Notes in Computer Science*, pp. 27-38, Springer, 2007.

However, it is difficult to accurately perform the similarity search using feature value vectors, which is a problem.

Suppose that the position of a projective point is adjusted so as to inversely stereographically project the feature value data on only a surface of a hypersphere S on the side facing a feature value space. After the adjustment, feature value data may be entered. In such a case, the feature value data may also be inversely stereographically projected on the surface of the hypersphere S on the side opposite to the feature value space across the hypersphere S, so that a shortcut of a point at infinity may occur between pieces of the feature value data that have been inversely stereographically projected.

FIG. 29 is a diagram for explaining the shortcut of the point at infinity. The point at infinity in a feature value space V is projected to one point on the north pole of the hypersphere S. As a result, for example, an inverse stereographic projection of a point p sufficiently far from a point $X_o$ in the feature value space V associates the point p with a point p' on the hypersphere S; and an inverse stereographic projection of a point q in the feature value space V associates the point q with a point q' on the hypersphere S. Such inverse stereographic projections cause the shortcut to occur. For example, in some cases, a path 10*b* passing near the point at infinity is shorter than a path 10*a* passing near the origin of the feature value space V. Such cases may make the distance between points apart from each other by a distance 10*c* in the feature value space V smaller on the hypersphere S, and, as a result, the Hamming distance between the bit strings of the point p and the point q may be reduced.

SUMMARY

According to an aspect of the embodiments, a classification method includes: setting a position of a projective point based on information on a domain of definition of a feature value space, using a processor; and projecting a vector present in the feature value space to a sphere present in a space of dimensions higher by at least one dimension than a dimension of the feature value space by using the set position of the projective point, using the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. It is to be noted that the embodiments do not limit the scope of right of the present disclosure. The embodiments can be combined as appropriate unless the details of processing thereof conflict with each other.

[a] First Embodiment

Figure 1:
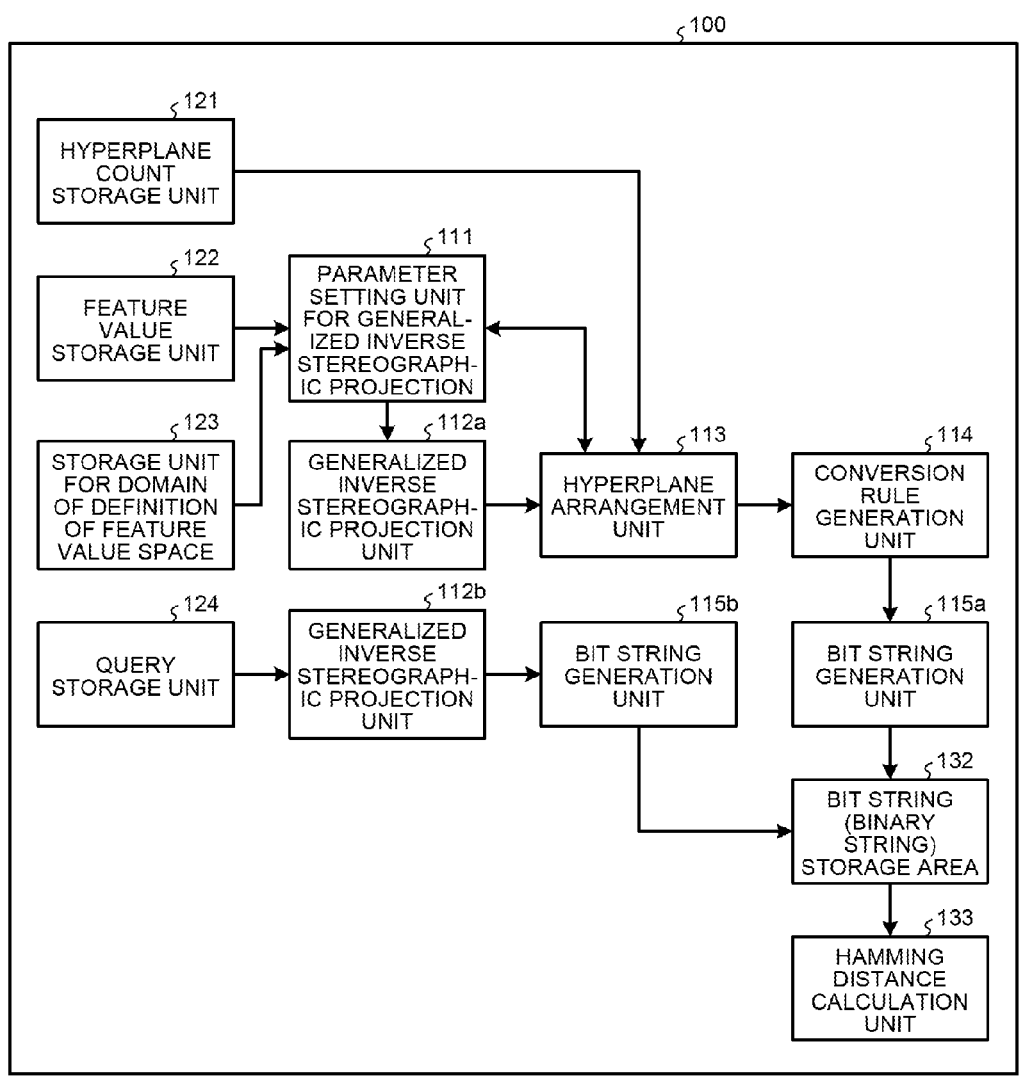
FIG. 1 is a diagram illustrating the system configuration of a classification device according to a first embodiment of the present invention.

The system configuration of a classification device 100 will be described using FIG. 1. FIG. 1 is a diagram illustrating the system configuration of the classification device according to a first embodiment of the present invention. As illustrated in the example of FIG. 1, the classification device 100 includes a hyperplane count storage unit 121, a feature value storage unit 122, a storage unit 123 for a domain of definition of a feature value space, a query storage unit 124, and a bit string storage area 132. Each of the storage units corresponds to a storage device, such as a semiconductor memory device (such as a random access memory (RAM), a read-only memory (ROM), or a flash memory), a hard disk, or an optical disc.

The classification device 100 also includes a parameter setting unit 111 for generalized inverse stereographic projection, a generalized inverse stereographic projection unit 112a, a hyperplane arrangement unit 113, a conversion rule generation unit 114, and a bit string generation unit 115a. The classification device 100 further includes a generalized inverse stereographic projection unit 112b, a bit string generation unit 115b, and a Hamming distance calculation unit 133. The function of each of the processing units can be implemented by an integrated circuit, such as an application-specific integrated circuit (ASIC) or a field-programmable gate array (FPGA). The function of each of the processing units can also be implemented by, for example, execution of a certain program by a central processing unit (CPU). The parameter setting unit 111 for the generalized inverse stereographic projection is an example of a setting unit. The generalized inverse stereographic projection unit 112a is an example of a projection unit.

The following describes the storage units. The hyperplane count storage unit 121 is a storage unit configured to store therein the number of hyperplanes to be arranged.

Figures 2, 3, 4:
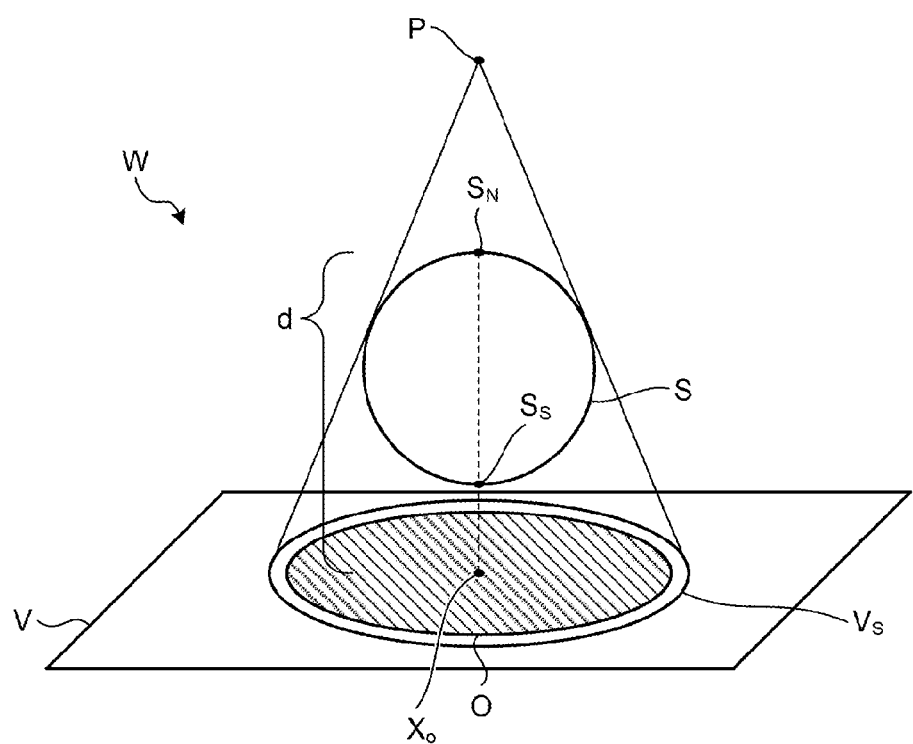
FIG. 2 is a diagram illustrating an example of the data structure of a feature value storage unit.
FIG. 3 is a diagram illustrating an example of the data structure of a bit string storage area.
FIG. 4 is a diagram for explaining a first example of setting a position of a projective point.

The feature value storage unit 122 is a storage unit configured to store therein a plurality of feature value vectors. FIG. 2 is a diagram illustrating an example of the data structure of the feature value storage unit. As illustrated in FIG. 2, the feature value storage unit 122 stores therein identification information and the feature value vectors so as to be associated with each other. The identification information is information for uniquely identifying each of the feature value vectors. The feature value vector is an m-dimensional feature value vector obtained from biological information of a user. Any related technique may be used as a method for obtaining the feature value vector from the biological information.

The storage unit 123 for the domain of definition of the feature value space is a storage unit configured to store therein information on the domain of definition of feature values to be set in the feature value space. The domain of definition of the feature values may be externally given, or may be estimated from retained data.

The query storage unit 124 is a storage unit configured to store therein a feature value vector used as a query. The classification device 100 searches the feature value storage unit 122 for a feature value vector resembling the feature value vector used as a query.

The bit string storage area 132 is a storage area that stores therein bit strings (binary strings) acquired from the bit string generation unit 115a to be described later. FIG. 3 is a diagram illustrating an example of the data structure of the bit string storage area. As illustrated in FIG. 3, the bit string storage area 132 stores therein the identification information and the bit strings so as to be associated with each other. The identification information is information for uniquely identifying each of the feature value vectors that have served as sources of generation of the bit strings. The bit strings are bit strings generated based on the feature value vectors.

The parameter setting unit 111 for the generalized inverse stereographic projection is a processing unit configured to set parameters for positions of a projective point and a hypersphere S that are used when the generalized inverse stereographic projection is performed. The parameter setting unit 111 for the generalized inverse stereographic projection acquires information on the domain of definition of the feature values from the storage unit 123 for the domain of definition of the feature value space. The information on the domain of definition of the feature values is, for example, information on the theoretical domain of definition of statistical values of feature value data and the feature value space. The generalized inverse stereographic projection units 112a and 112b set the domain of definition based on the acquired information on the domain of definition of the feature values.

Based on the domain of definition thus set, the parameter setting unit 111 for the generalized inverse stereographic projection determines a position of the projective point $p=(p_1, p_2, \ldots, p_{m+1})$, intersection coordinates $x_o = (x_{o1}, \ldots, x_{om})$ between a straight line connecting the north and south poles and the feature value space, and a parameter d. For example, based on the information on the domain of definition of the feature value space, the parameter setting unit 111 for the generalized inverse stereographic projection may set constraint conditions on the parameters p, $x_o$, and d so that the image of a generalized stereographic projection contains the entire domain of definition, and may set the parameters with a predetermined method. The parameter $x_o$ is coordinates of a point in a feature value space V mapped to a south pole $S_S$ of the hypersphere S. The parameter d is a parameter for adjusting the scale of the stereographic projection, and corresponds to the radius of the hypersphere S when the equator of the hypersphere S is mapped to the feature value space V.

The domain of definition of quantities called the feature values widely varies. Examples of the domain of definition include, but are not limited to, all real numbers, only positive real numbers, only real numbers in the range of [0, 1], and an area enclosed by a linear inequality. The domain of definition of the generalized inverse stereographic projection greatly varies depending on the position of the projective point p. Hence, if the point p is positioned so that the domain of definition of the generalized inverse stereographic projection does not include the domain of definition of the feature values, it is difficult to perform the mapping. To prevent such a problem, the parameters p, $x_o$, and d are limited.

When the hypersphere S is set in a space W, the position of the projective point p is set based on the following three broadly classified limitations according to the domain of definition of the feature values.

The parameter setting unit 111 for the generalized inverse stereographic projection sets a first limitation that limits a projective point P to be set above the hypersphere S in the space W if the domain of definition of the feature values is contained in an ellipse. For example, the parameter setting unit 111 for the generalized inverse stereographic projection limits the location range of the projective point P to be outside the hypersphere S. The parameter setting unit 111 for the generalized inverse stereographic projection also limits the (m+1)th component of the projective point P to be one or larger. In the first embodiment, the hypersphere S is embedded in the space W that has dimensions higher by at least one dimension than m dimensions.

Based on the first limitation, the parameter setting unit 111 for the generalized inverse stereographic projection sets the position of the projective point p above the hypersphere S. The parameter setting unit 111 for the generalized inverse stereographic projection sets the position of the projective point p above the hypersphere S so that the image of the generalized stereographic projection of the hypersphere S contains the domain of definition of the feature values. For example, the parameter setting unit 111 for the generalized inverse stereographic projection obtains a sphere having the minimum radius among spheres in the feature value space including all feature value data, and sets the position of the projective point p, the intersection $x_o$, and the parameter d so that the image of the generalized stereographic projection contains the sphere having the minimum radius.

FIG. 4 is a diagram for explaining a first example of setting the position of the projective point. As illustrated in FIG. 4, if a domain of definition O is contained in the ellipse, the parameter setting unit 111 for the generalized inverse stereographic projection sets the position of the projective point p above the hypersphere S so that an image $V_s$ of the generalized stereographic projection contains the domain of definition O, and disposes the hypersphere S. The parameter setting unit 111 for the generalized inverse stereographic projection sets the parameter p to the coordinates of the projective point P thus set, the parameter $x_o$ to the coordinates of the intersection between the straight line connecting a north pole $S_N$ and the south pole $S_S$ of the hypersphere S and the feature value space, and the parameter d to the height of the north pole $S_N$ of the hypersphere S.

A description will be given of a specific example of the parameters that are set when the position of the projective point p is set above the hypersphere S. For example, the parameter setting unit 111 for the generalized inverse stereographic projection sets, when it has set $x_o$ to $(\mu_1, \ldots, \mu_m)$ and d to one. The parameter setting unit 111 for the generalized inverse stereographic projection obtains the sphere $S_1$ having the minimum radius among all spheres $S_1$ including the feature value data, and assumes the center and the radius of the sphere $S_1$ as $\mu$ and $r_1$, respectively. Then, the position of the projective point p to $(\mu_1, \ldots, \mu_n, r_1/\{r_1^2-1\}^{1/2})$. The coordinates of $x_o$ may be set to, for example, the coordinates of the center of a sphere $S_1$ having the minimum radius among all spheres $S_1$ including the feature value data, or maybe set to the average value of the feature value data.

The parameter setting unit 111 for the generalized inverse stereographic projection calculates the moment of the feature value data, and estimates the location range of the data based on the moment. The parameter setting unit 111 for the generalized inverse stereographic projection may set the position of the projective point p, the intersection $x_o$, and the parameter d so that the image of the generalized stereographic projection contains the location range of the estimated data.

Using FIG. 4, a description will be given of a case of setting the position of the projective point p using the moment of the feature value data. As illustrated in FIG. 4, the parameter setting unit 111 for the generalized inverse stereographic projection estimates the domain of definition O based on the moment of the feature value data. The parameter setting unit 111 for the generalized inverse stereographic projection sets the projective point P above the hypersphere S so that the image Vs of the generalized stereographic projection of the hypersphere S contains the estimated the domain of definition. At this time, the parameter setting unit 111 for the generalized inverse stereographic projection sets the parameter p to the coordinates of the projective point P set above the hypersphere S. The parameter setting unit 111 for the generalized inverse stereographic projection sets the parameters $x_o$ and d to the intersection coordinates $X_o$ between the straight line connecting the north and the south poles $S_N$ and $S_S$ of the hypersphere S set in the space W and the feature value space, and to the parameter d, respectively.

The parameter setting unit 111 for the generalized inverse stereographic projection calculates a second-order moment v based on Expression (1) below. In Expression (1), $x_i^{(k)}$ corresponds to the i-th component of the k-th feature value vector, and u corresponds to the average vector of the feature value vector. K is the number of the feature vectors.

$$v = \sqrt{\frac{1}{K}\sum_{k=1}^{K}\sum_{i=1}^{m}(x_i^{(k)} - u_i)^2} \quad (1)$$

The parameter setting unit 111 for the generalized inverse stereographic projection sets a second limitation that limits the projective point P to be set on the surface of the hypersphere S if the domain of definition is contained in one of divided regions obtained by dividing the feature value space V by a hyperplane H.

The parameter setting unit 111 for the generalized inverse stereographic projection sets the position of the projective point based on the second limitation. The parameter setting unit 111 for the generalized inverse stereographic projection obtains a point on the hypersphere S whose tangent plane and the feature value space form a common set serving as the hyperplane H, and that serves as a projective point so that all the spheres $S_1$ including the feature value data are contained in the image of the generalized stereographic projection, and the parameter setting unit 111 for the generalized inverse stereographic projection determines the obtained point to be the projective point P.

Figure 5:
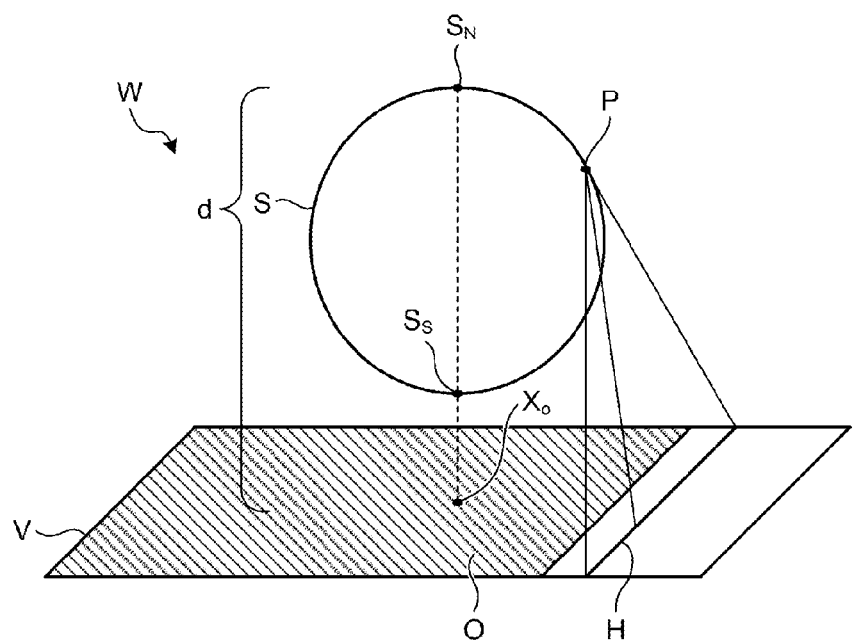
FIG. 5 is a diagram for explaining a second example of setting the position of the projective point.

FIG. 5 is a diagram for explaining a second example of setting the position of the projective point. As illustrated in FIG. 5, the parameter setting unit 111 for the generalized inverse stereographic projection searches for a tangent plane passing through the hyperplane H in the feature value space V among tangent planes tangent to the surface of the hypersphere S. The parameter setting unit 111 for the generalized inverse stereographic projection sets the position of the projective point p in the position of the tangent point between a found tangent plane passing through the hyperplane H and the hypersphere S. The parameter setting unit 111 for the generalized inverse stereographic projection sets the parameter p to the coordinates of the projective point P lying in the position where the tangent plane is tangent to the hypersphere S. The parameter setting unit 111 for the generalized inverse stereographic projection sets the parameters $x_o$ and d to the intersection coordinates $X_o$ between the straight line connecting the north and the south poles $S_N$ and $S_S$ of the hypersphere S set in the space W and the feature value space, and to the parameter d for the north pole $S_N$ of the hypersphere S, respectively.

The parameter setting unit 111 for the generalized inverse stereographic projection sets a third limitation that limits the projective point P to be set inside the hypersphere S if no domain of definition can be identified in the feature value space V. The parameter setting unit 111 for the generalized inverse stereographic projection sets the position of the projective point p inside the hypersphere S based on the third limitation.

Figure 6:
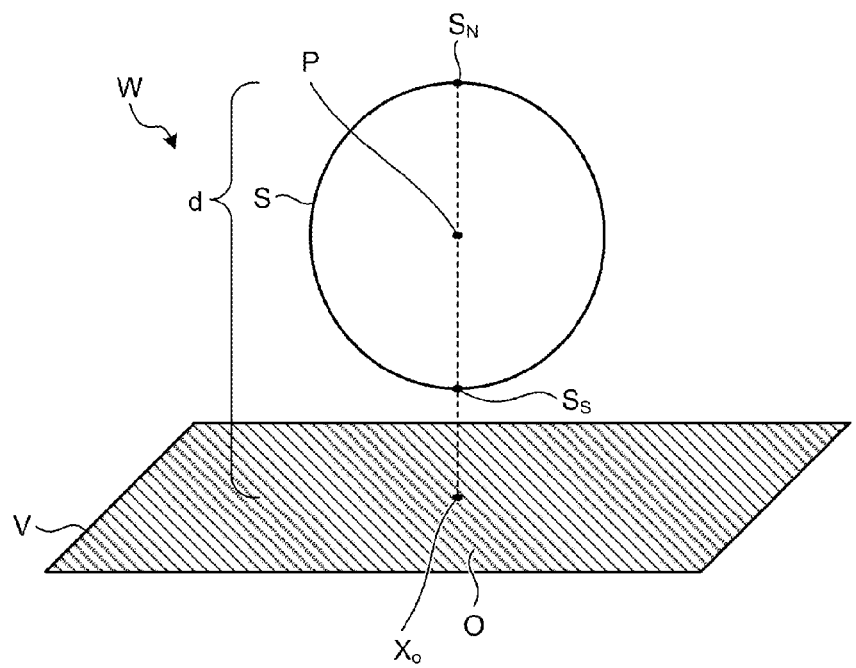
FIG. 6 is a diagram for explaining a third example of setting the position of the projective point.

FIG. 6 is a diagram for explaining a third example of setting the position of the projective point. As illustrated in FIG. 6, the parameter setting unit 111 for the generalized inverse stereographic projection sets the projective point P inside the hypersphere S if the domain of definition O is not identified in the feature value space V. At this time, the parameter setting unit 111 for the generalized inverse stereographic projection sets the parameter p to the coordinates of the projective point P set inside the hypersphere S. The parameter setting unit 111 for the generalized inverse stereographic projection sets the parameters $x_o$ and d to the intersection coordinates $X_o$ between the straight line connecting the north and the south poles $S_N$ and $S_S$ of the hypersphere S set in the space W and the feature value space, and to the parameter d for the north pole $S_N$ of the hypersphere S, respectively.

Based on the position of the projective point thus set, the parameter setting unit 111 for the generalized inverse stereographic projection outputs the parameters p, $x_o$, and d to the generalized inverse stereographic projection unit 112a and the hyperplane arrangement unit 113. In this manner, the parameter setting unit 111 for the generalized inverse stereographic projection sets the parameters p, $x_o$, and d so that the image of the generalized stereographic projection of the hypersphere S contains the entire domain of definition.

The generalized stereographic projection refers to a mapping that allows the projective point to be a point other than the north pole of the hypersphere S having the center at the origin. For example, if the hypersphere S having the center at the origin is set and the projective point is set at a point other than the north pole of the hypersphere S, the generalized stereographic projection is performed by associating a point on the hypersphere S with a point in the feature value space V based on the projective point thus set.

A description will be given of the generalized stereographic projection when the hypersphere S of m dimensions is embedded in the space W that has dimensions one or more higher than m. In this case, denoting the (m+1)th component as the z-axis component, the point on the hypersphere S projected in the generalized stereographic projection is a point whose z-component is equal to or smaller than the z-component of the projective point. If two points on the hypersphere S other than the projective point are projected to a single point in the feature value space, one of the two points on the hypersphere S farther from the projective point is selected as a point to be projected, and the point nearer to the projective point is not included in the domain of definition of the generalized stereographic projection.

The image of the generalized stereographic projection is not the feature value space V, so that the image of the generalized stereographic projection serves as the domain of definition of the inverse generalized stereographic projection. For example, if an image is obtained by applying the generalized stereographic projection to project the hypersphere S to the feature value space V based on the projective point P set at a point other than the north pole of the hypersphere S, such an image serves as the domain of definition of the generalized stereographic projection.

Figure 7:
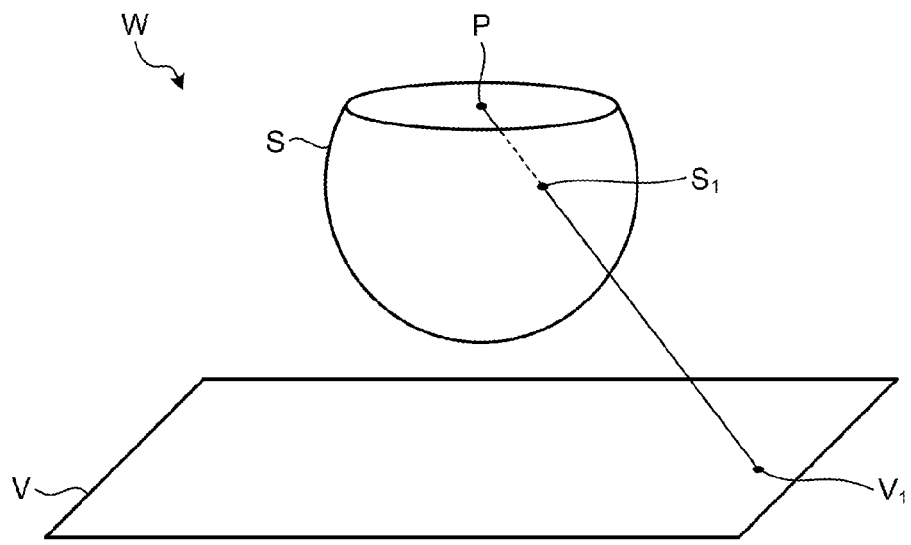
FIG. 7 is a diagram illustrating a generalized stereographic projection when the projective point lies inside a hypersphere S.

The generalized stereographic projection applied to the hypersphere S is broadly categorized into four depending on the position of the projective point. The following describes four examples of cases in which the generalized stereographic projection is applied to the hypersphere S. A first example of the generalized stereographic projection will be described using FIG. 7. FIG. 7 is a diagram illustrating the generalized stereographic projection when the projective point lies inside the hypersphere S. If the image of the generalized stereographic projection corresponds to the entire feature value space V, the projective point P is set inside the hypersphere S so that the image of the generalized stereographic projection occupies the entire feature value space V. By this setting, in the space W, for example, an intersection $S_1$ between the straight line connecting the projective point P and a point $V_1$ in the feature value space and the hypersphere S is associated with the point $V_1$ in the feature value space.

Figure 8:
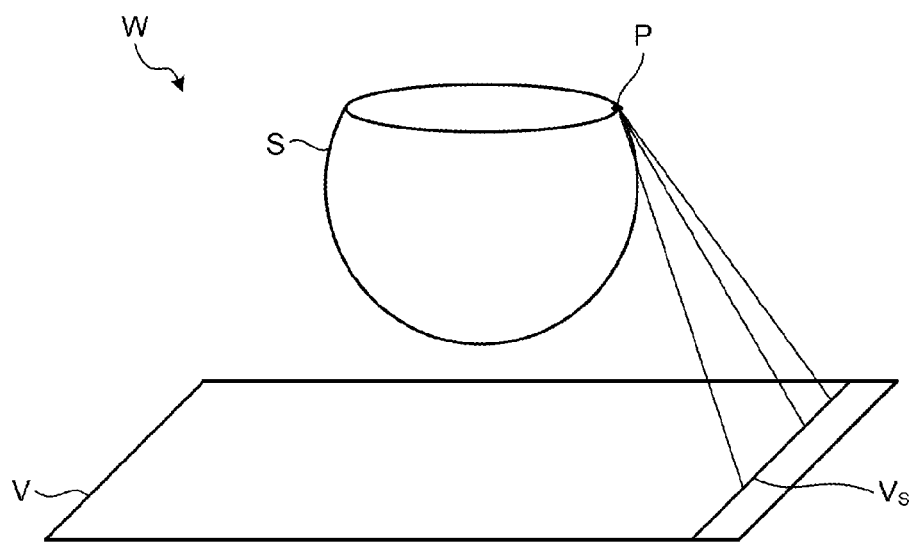
FIG. 8 is a diagram illustrating the generalized stereographic projection when the projective point lies on the hypersphere S.

A second example of the generalized stereographic projection will be described using FIG. 8. FIG. 8 is a diagram illustrating the generalized stereographic projection when the projective point lies on the hypersphere S. If, as illustrated in FIG. 8, the image of the generalized stereographic projection is included in a region obtained by dividing the feature value space V by one hyperplane, the projective point P is set on the hypersphere S so that the image of the generalized stereographic projection occupies a part of the feature value space V and includes infinity in one direction while being finite in the other direction.

Figure 9:
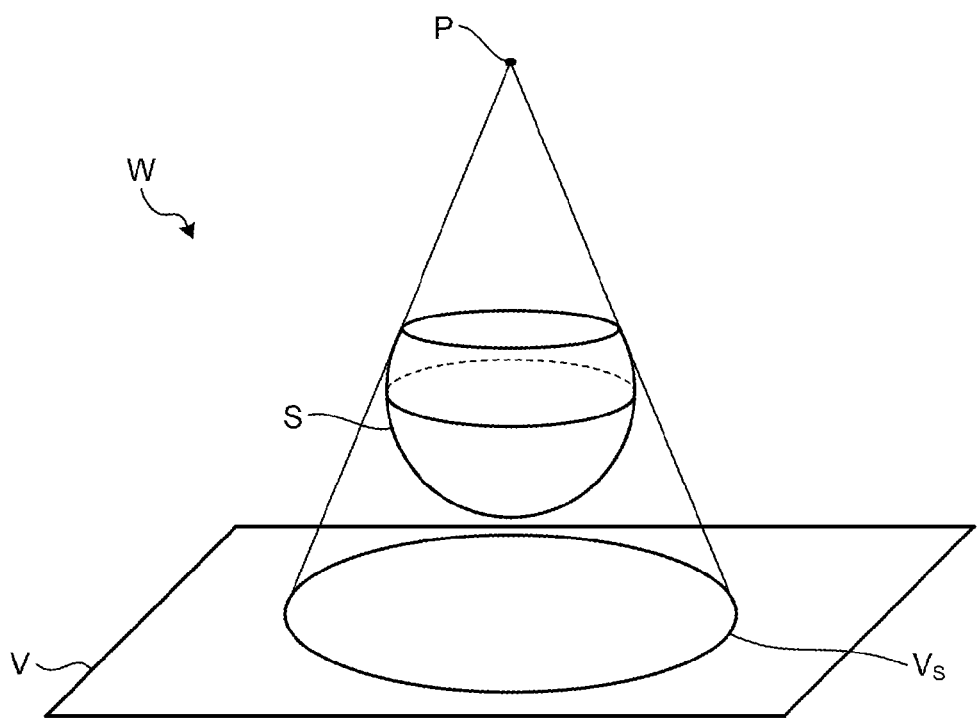
FIG. 9 is a diagram illustrating the generalized stereographic projection when the projective point lies outside the hypersphere S.

A third example of the generalized stereographic projection will be described using FIG. 9. FIG. 9 is a diagram illustrating the generalized stereographic projection when the projective point lies outside the hypersphere S. If, as illustrated in FIG. 9, the image of the generalized stereographic projection is contained in the ellipse, the projective point P is set in a position that is outside the hypersphere S and has a z-component larger than one.

Figure 10:
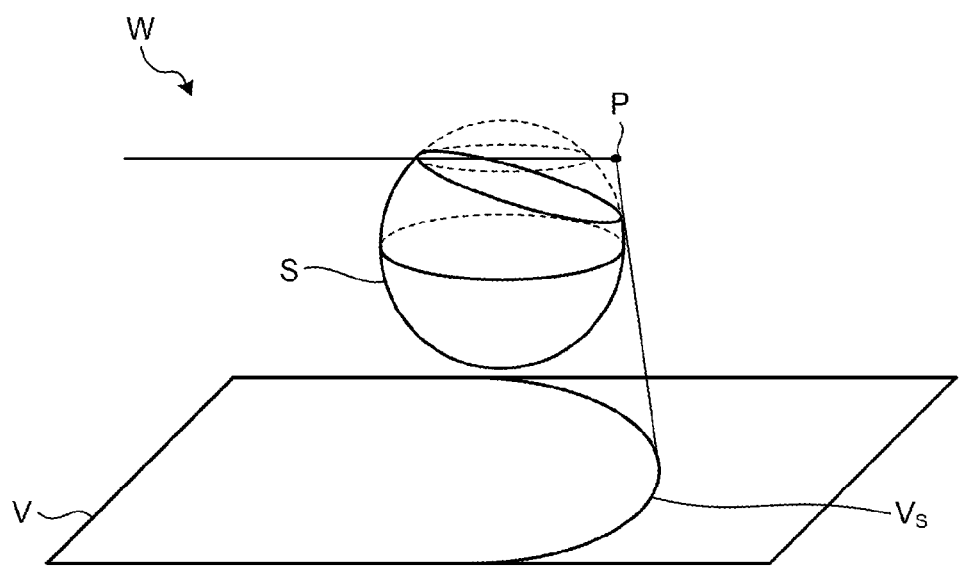
FIG. 10 is a diagram illustrating the generalized stereographic projection when the projective point lies outside the hypersphere S, and has a Z-component in the range of [−1, 1]

A fourth example of the generalized stereographic projection will be described using FIG. 10. FIG. 10 is a diagram illustrating the generalized stereographic projection when the projective point lies outside the hypersphere S, and has a z-component in the range of [−1, 1]. If, as illustrated in FIG. 10, the image of the generalized stereographic projection includes infinity in one direction while being finite in the other direction, the projective point P is set in a position that is outside the projective point P and has a z-component in the range of [−1, 1].

By mapping a cross section obtained by cutting the hypersphere S with a hyperplane to the feature value space using the stereographic projection, a hypersphere or a hyperplane is obtained. By doing the same using the generalized stereographic projection, the obtained image is an algebraic manifold represented by zero points of an at most quartic polynomial of m variables. The algebraic manifold represented by zero points of an at most quartic polynomial is called a quartic hypersurface. When the projective point P is set at the center of the hypersphere S an at most quadric surface is obtained. Express the coefficients of second-order terms of m variables using a matrix, and denote the matrix as A. Various at most quadric hypersurfaces are formed by eigenvalues of the matrix A. For the sake of simplicity, FIGS. 11, 12, 13, and 14 illustrate a relation between a cross section and each of the at most quadric hypersurfaces when m=2 and the projective point lies at the center of the hypersphere S. In this case, the equator of the hypersphere S corresponds to a point at infinity in the feature value space, and an intersecting point between the cross section and the equator indicates the behavior of the at most quadric hypersurface at infinity.

Figure 11:
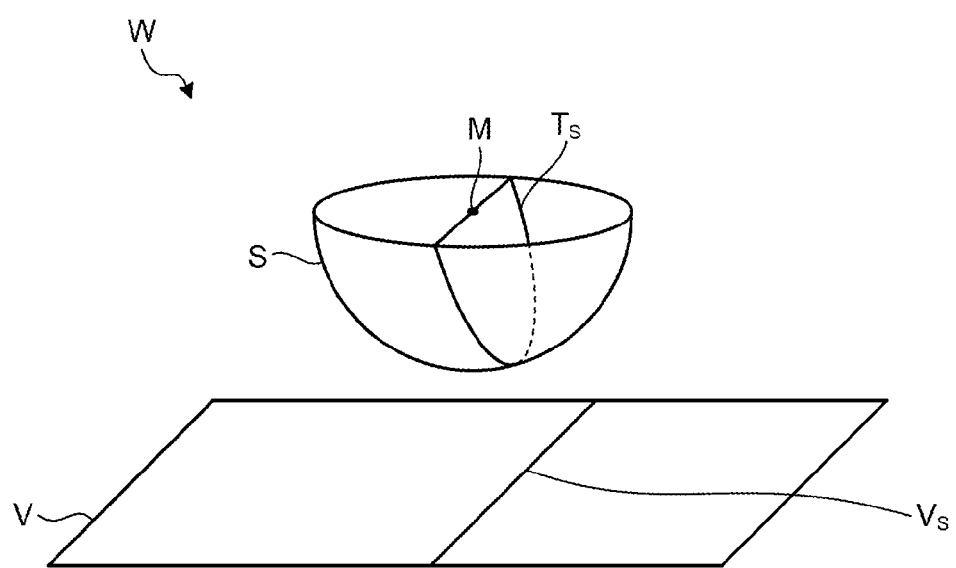
FIG. 11 is a diagram illustrating a first example in which a cross section of the hypersphere S is projected using the generalized stereographic projection.

The following describes an example of the generalized stereographic projection using the cross section obtained by cutting the hypersphere S with the hyperplane. FIG. 11 is a diagram illustrating a first example in which the cross section of the hypersphere S is projected using the generalized stereographic projection. As illustrated in FIG. 11, using the generalized stereographic projection, a cross section Ts of the hypersphere S formed by a hyperplane passing through a center point M of the hypersphere S is projected to the feature value space V so as to set a region $V_s$ that includes infinity in one direction while being finite in the other direction. The image obtained by the hyperplane forms a straight line.

Figure 12:
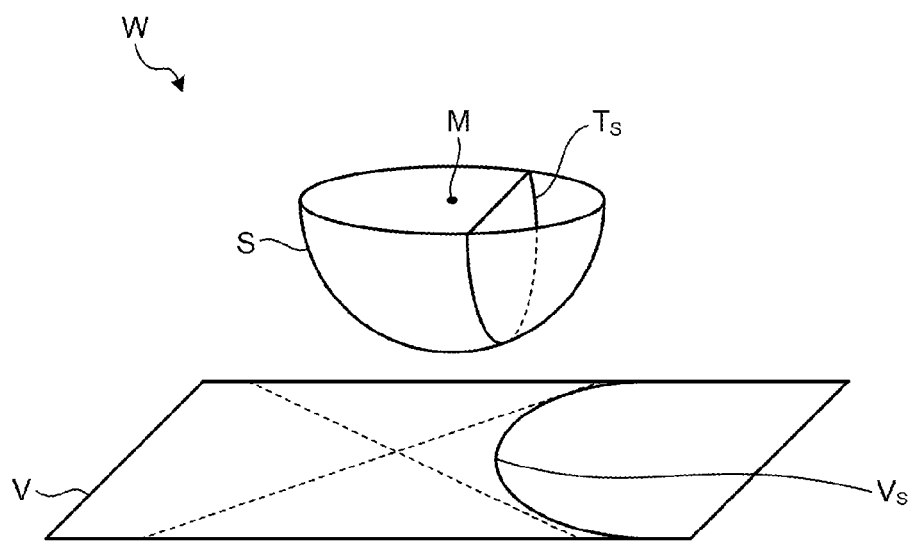
FIG. 12 is a diagram illustrating a second example in which the cross section of the hypersphere S is projected using the generalized stereographic projection.

FIG. 12 is a diagram illustrating a second example in which the cross section of the hypersphere S is projected using the generalized stereographic projection. As illustrated in FIG. 12, using the generalized stereographic projection, the cross section Ts of the hypersphere S formed by a hyperplane orthogonal to the feature value space V is projected to the feature value space V so as to set a region $V_s$ that includes infinity in one direction while being finite in the other direction. The image obtained by the hyperplane forms a hyperbola.

Figure 13:
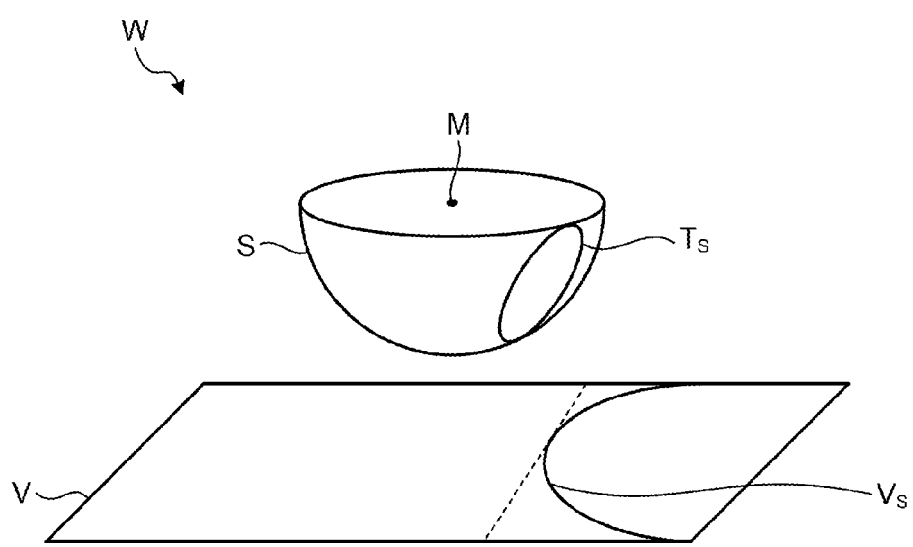
FIG. 13 is a diagram illustrating a third example in which the cross section of the hypersphere S is projected using the generalized stereographic projection.

FIG. 13 is a diagram illustrating a third example in which the cross section of the hypersphere S is projected using the generalized stereographic projection. As illustrated in FIG. 13, a spherical surface of a hemisphere on the side of the hypersphere S facing the feature value space V is cut by a hyperplane forming an angle smaller than 90 degrees with the feature value space V so as to form the cross section Ts of the hypersphere S. The cross section Ts of the hypersphere S is further projected to the feature value space V using the generalized stereographic projection so as to set the region $V_s$ that includes infinity in one direction while being finite in the other direction. The image obtained by the hyperplane forms a parabola.

Figure 14:
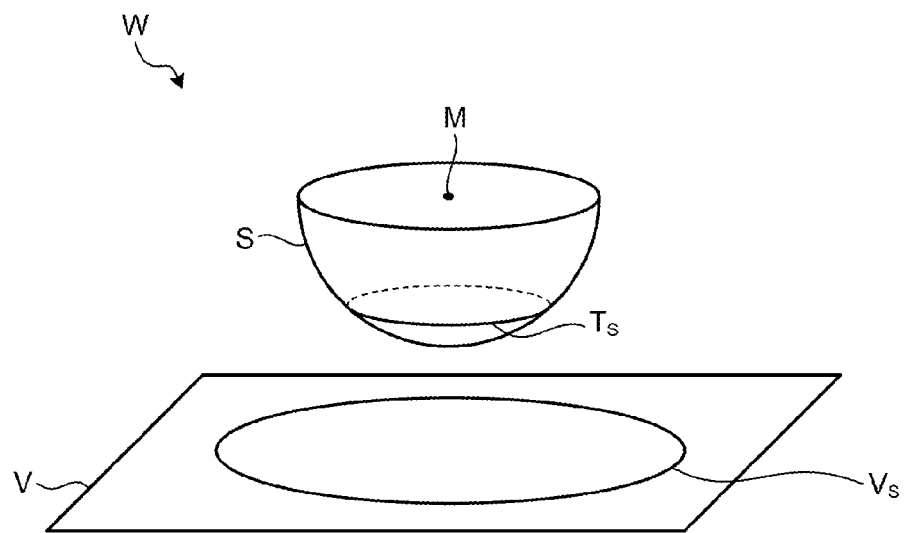
FIG. 14 is a diagram illustrating a fourth example in which the cross section of the hypersphere S is projected using the generalized stereographic projection.

FIG. 14 is a diagram illustrating a fourth example in which the cross section of the hypersphere S is projected using the generalized stereographic projection. As illustrated in FIG. 14, the spherical surface of the hemisphere on the side of the hypersphere S facing the feature value space V is cut by a hyperplane parallel to the feature value space V so as to form the cross section Ts of the hypersphere S. The cross section Ts of the hypersphere S is further projected to the feature value space V using the generalized stereographic projection so as to set the region $V_s$ that is finite in both directions. The image obtained by the hyperplane forms an ellipse.

The generalized inverse stereographic projection units 112a and 112b are processing units that apply the generalized inverse stereographic projection to the m-dimensional feature value space V so as to associate the feature value space V with the hypersphere S of (m+g−1) dimensions embedded in the space W that has dimensions higher by g than m, where g is an integer of one or larger. In the description below, the generalized inverse stereographic projection units 112a and 112b will be collectively called a generalized inverse stereographic projection unit 112, where appropriate. The description below assumes that g is one.

The generalized inverse stereographic projection unit 112a performs the generalized inverse stereographic projection of the feature value vector based on the parameters p, $x_o$, and d that have been set. The generalized inverse stereographic projection unit 112a outputs the coordinates of the feature value vector that has been projected using the generalized inverse stereographic projection to the hyperplane arrangement unit 113.

Figure 15:
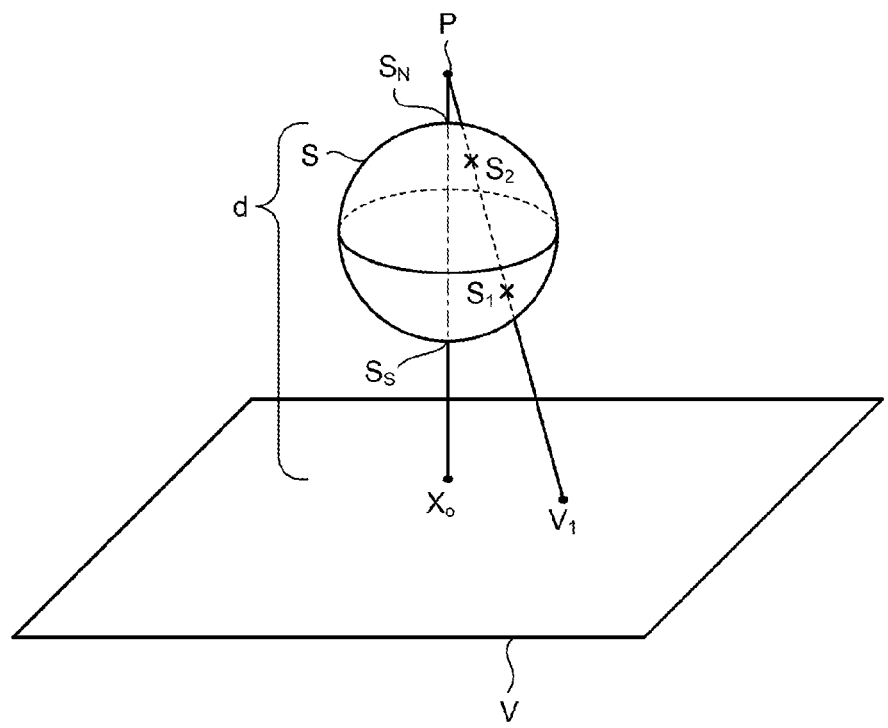
FIG. 15 is a first diagram for explaining a generalized inverse stereographic projection.

A description will be given of the generalized inverse stereographic projection when the projective point P is set above the hypersphere S. FIG. 15 is a first diagram for explaining the generalized inverse stereographic projection. As illustrated in the example of FIG. 15, the generalized inverse stereographic projection associates a point in the feature value space V with a point on the hypersphere S. In the example illustrated in FIG. 15, the straight line passing through the projective point P and $V_1$ has intersections $S_1$ and $S_2$ with the hypersphere S. Of these two intersections, the point $S_1$ lying farther from the projective point is projected. This projection associates the point $V_1$ in the feature value space V with the point $S_1$ on the hypersphere S. In this manner, the generalized inverse stereographic projection unit 112a projects the point $V_1$ in the feature value space V to the point $S_1$ on the hypersphere S using the generalized inverse stereographic projection. The intersection between the straight line connecting the north and the south poles $S_N$ and $S_S$ of the hypersphere S and the feature value space V is defined as $X_o$. For example, the coordinates of the north pole $S_N$ are $x_{o1}, x_{o2}, \ldots, x_{om}$, and 1, and the coordinates of the south pole $S_S$ are $x_{o1}, x_{o2}, \ldots, x_{om}$, and −1. The height from the feature value space V to the north pole $S_N$ of the hypersphere S is denoted as d.

Figure 16:
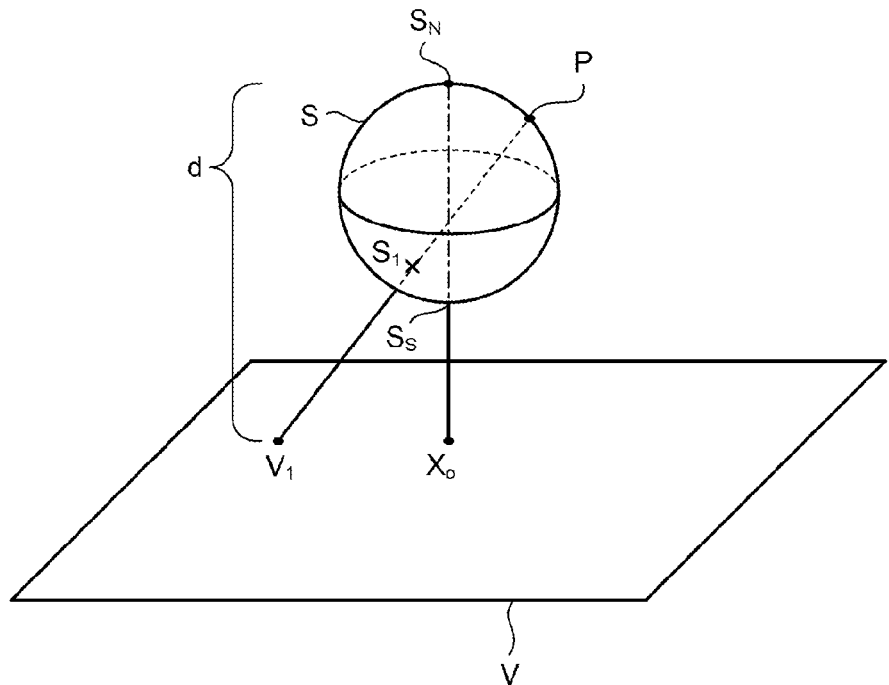
FIG. 16 is a second diagram for explaining the generalized inverse stereographic projection.

The following describes the generalized inverse stereographic projection when the projective point P is set on the surface of the hypersphere S. FIG. 16 is a second diagram for explaining the generalized inverse stereographic projection. As illustrated in the example of FIG. 16, the generalized inverse stereographic projection associates a point in the feature value space V with a point on the hypersphere S. For example, the intersection $S_1$ between the straight line passing through the projective point P and $V_1$ and the hypersphere S is projected. This projection associates the point $V_1$ in the feature value space V with the point $S_1$ on the hypersphere S. In this manner, the generalized inverse stereographic projection unit 112a projects the point $V_1$ in the feature value space V to the point $S_1$ on the hypersphere S using the generalized inverse stereographic projection.

Figure 17:
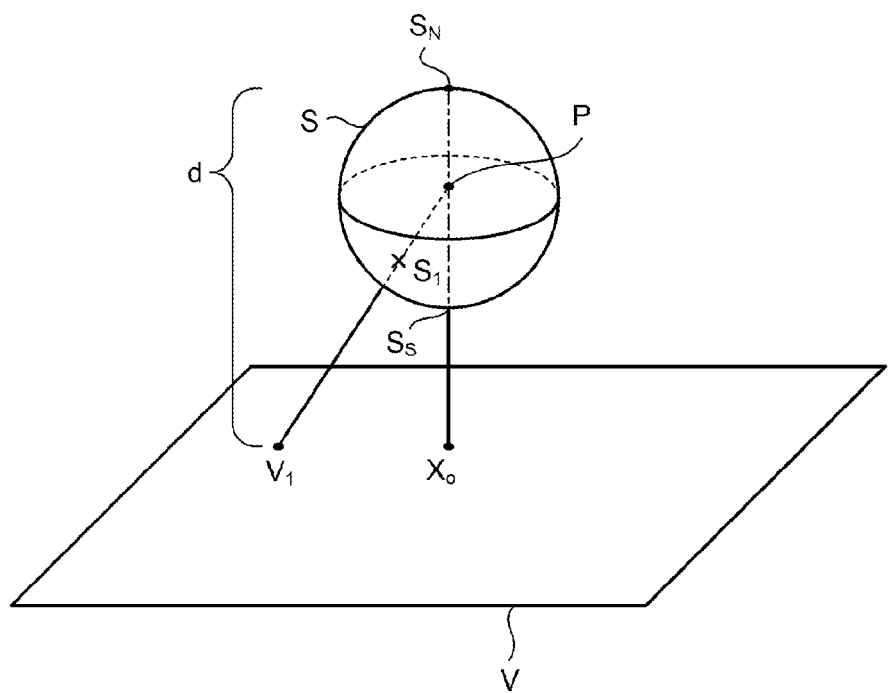
FIG. 17 is a third diagram for explaining the generalized inverse stereographic projection.

The following describes the generalized inverse stereographic projection when the projective point P is set inside the hypersphere S. FIG. 17 is a third diagram for explaining the generalized inverse stereographic projection. As illustrated in the example of FIG. 17, the generalized inverse stereographic projection associates a point in the feature value space V with a point on the hypersphere S. For example, the intersection $S_1$ between the straight line passing through the projective point P and $V_1$ and the hypersphere S is projected. This projection associates the point $V_1$ in the feature value space V with the point $S_1$ on the hypersphere S. In this manner, the generalized inverse stereographic projection unit 112a projects the point $V_1$ in the feature value space V to the point $S_1$ on the hypersphere S using the generalized inverse stereographic projection.

An example of the generalized inverse stereographic projection will be described. For example, assuming the projective point P to be the center of the hypersphere S and the feature value vector (coordinates) of the feature value space V to be $(x_1, x_2, \ldots, x_m)$, the generalized inverse stereographic projection $(f^{-1}:V \to W)$ is given by Expression (2). $r^2$ is defined by Expression (3). $\alpha$ in Expression (2) is defined by Expression (4).

$$f^{-1}(x_1, \ldots, x_m) = \left( \frac{(x_1 - x_{o1})}{r} \frac{1}{\sqrt{1+\alpha^2}} + x_{o1}, \right. \quad (2)$$
$$\left. \ldots, \frac{(x_m - x_{om})}{r} \frac{1}{\sqrt{1+\alpha^2}} + x_{om}, \frac{-\alpha}{\sqrt{1+\alpha^2}} \right)$$

$$r^2 = \sum_{i=1}^{m} (x_i - x_{oi})^2 \quad (3)$$

$$\alpha = (d-1)/r \quad (4)$$

Figure 18:
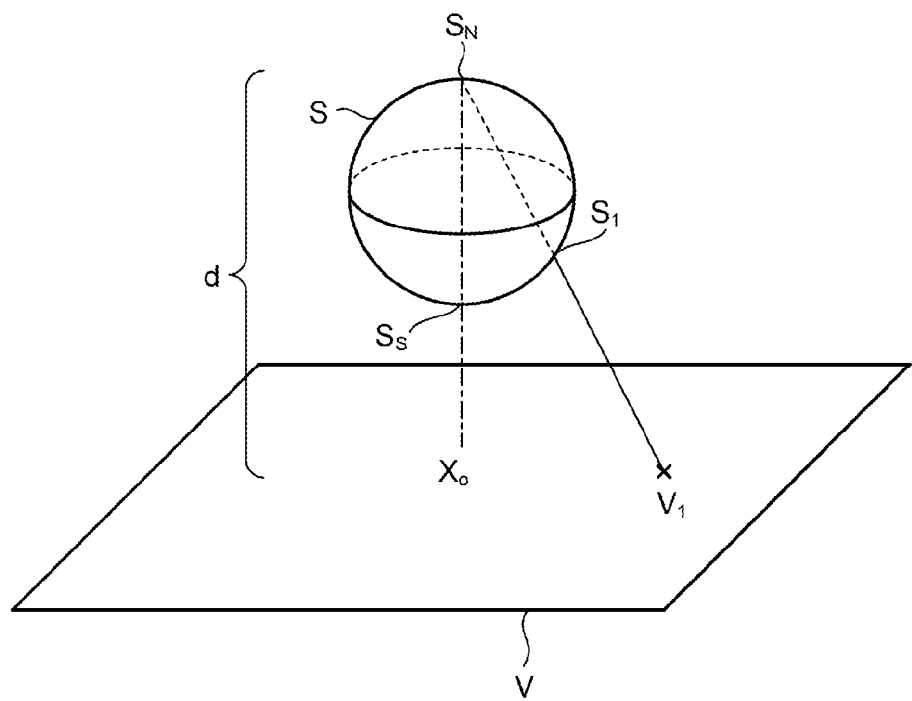
FIG. 18 is a diagram (1) illustrating a relation between a feature value space V and the hypersphere S.
Figure 19:
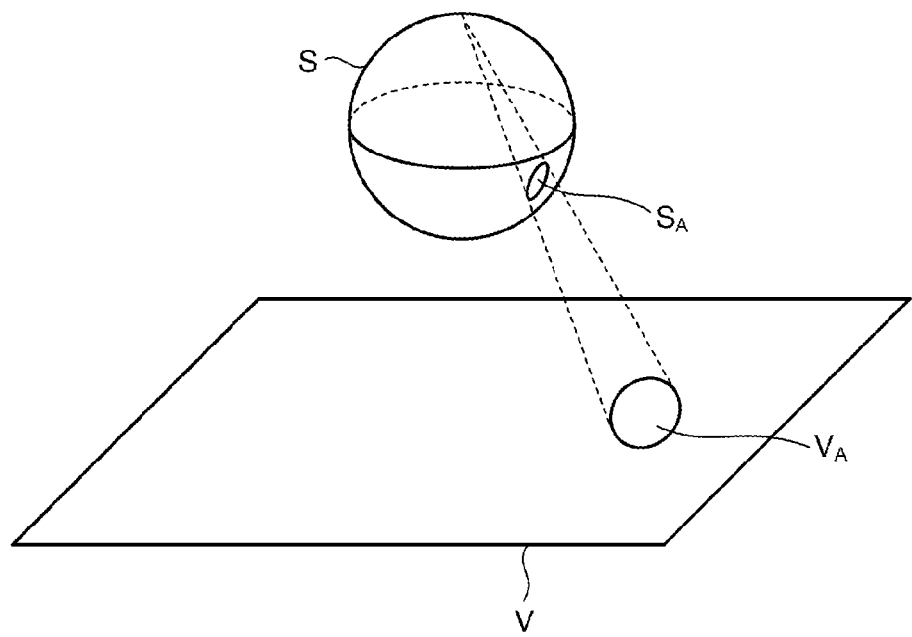
FIG. 19 is a diagram (2) illustrating the relation between the feature value space V and the hypersphere S.

The stereographic projection is a mapping in the case in which the hypersphere S having the center at the origin is set, and the north pole of the hypersphere S serves as the projective point. FIGS. 18 and 19 are diagrams illustrating a relation between the feature value space V and the hypersphere S. As illustrated in FIG. 18, the inverse stereographic projection associates a point in the feature value space V with a point on the hypersphere S. The example illustrated in FIG. 18 associates the point $V_1$ in the feature value space V with the point $S_1$ on the hypersphere S. The intersection between the straight line passing through the north pole $S_N$ and the point $V_1$ and the surface of the hypersphere S corresponds to $S_1$. For example, as illustrated in FIG. 19, a cross section $S_A$ of the hypersphere S is associated with a region $V_A$ of the feature value space V.

The inverse stereographic projection is an inverse mapping of the stereographic projection. The stereographic projection is defined as follows: the hypersphere S and the feature value space V are arranged as illustrated in FIG. 18, and a straight line is drawn from the north pole $S_N$ and intersects with the hypersphere S at the intersection $S_1$ and with the feature value space V at the intersection $V_1$; then, the stereographic projection is defined as a mapping from the intersection $S_1$ to the intersection $V_1$.

Assuming the feature value vector (coordinates) of the feature value space V to be (x1, x2, ..., xm), the inverse stereographic projection $(f^{-1}:V \to W)$ is given by Expression (5), where $r^2$ in Expression (5) is defined by Expression (6).

$$f^{-1}(x_1, \ldots, x_m) = \quad (5)$$
$$\left( \frac{2d(x_1 - x_{o1})}{d^2 + r^2} + x_{o1}, \ldots, \frac{2d(x_m - x_{om})}{d^2 + r^2} + x_{om}, \frac{-d^2 + r^2}{d^2 + r^2} \right)$$

$$r^2 = \sum_{i=1}^{m} (x_i - x_{oi})^2 \quad (6)$$

In Expressions (5) and (6), $x_o$ and d are parameters. The parameters $x_o$ and d correspond to $x_o$ and d illustrated in FIG. 18.

The hyperplane arrangement unit 113 is a processing unit configured to arrange n hyperplanes cutting across the hypersphere S of (m+g−1) dimensions in the hypersphere S based on the number of hyperplanes n stored in the hyperplane count storage unit 121. Provided that the n hyperplanes cut across the hypersphere S, the hyperplane arrangement unit 113 may arrange the n hyperplanes at random or in predetermined positions. The hyperplane arrangement unit 113 identifies the normal vectors and the offset coordinates of the respective hyperplanes, and outputs the data of the normal vectors and the data of the offset coordinates thus identified to the conversion rule generation unit 114. The normal vectors are represented as $(v_1, v_2, \ldots, v_n)$, and the offset coordinates are represented as $c_1, c_2, \ldots,$ and $c_n$.

The conversion rule generation unit 114 is a processing unit configured to generate information on conversion rules based on the data of the normal vectors and the data of the offset coordinates. The conversion rule generation unit 114 generates data $W_{11}, W_{12}, \ldots,$ and $W_{n(m+1)}$ of an n×(m+1) matrix by arranging n normal vectors. For example, each row of the n×(m+1) matrix in Expression (7) corresponds to a normal vector. The conversion rule generation unit 114 assigns random numbers as values to elements at dimensions lacking values in the data of the n×(m+1) matrix. The conversion rule generation unit 114 generates the offset coordinates as n×1 pieces of data.

$$\begin{bmatrix} w_{11} & w_{12} & w_{13} & \ldots & w_{1(m+1)} \\ w_{21} & w_{22} & w_{23} & \ldots & w_{2(m+1)} \\ \vdots & \vdots & \vdots & \ldots & \vdots \\ w_{n1} & w_{n2} & w_{n3} & \ldots & w_{n(m+1)} \end{bmatrix} \begin{bmatrix} x_1 \\ x_2 \\ \vdots \\ x_{(m+1)} \end{bmatrix} + \begin{bmatrix} c_1 \\ c_2 \\ \vdots \\ c_n \end{bmatrix} = \begin{bmatrix} b_1 \\ b_2 \\ \vdots \\ b_n \end{bmatrix} \quad (7)$$

The conversion rule generation unit 114 outputs the data of the n×(m+1) matrix and the n×1 pieces of data to the bit string generation unit 115a.

Based on the feature value vector stored in the query storage unit 124 and the parameters p, $x_o$, and d that have been set, the generalized inverse stereographic projection unit 112b performs the inverse stereographic projection, and calculates coordinates on the hypersphere S corresponding to the feature value vector. The generalized inverse stereographic projection unit 112b outputs the results to the bit string generation unit 115b.

The bit string generation unit 115a calculates $b_1$, $b_2$, $b_3$, ..., and $b_n$ using Expression (7).

After calculating $b_1$, $b_2$, $b_3$, ..., and $b_n$, the bit string generation unit 115a calculates a bit string by converting $b_N$ having a positive value into one, and converting $b_N$ having a nonpositive value into zero. For example, if the values of $b_1$, $b_2$, $b_3$, ..., and $b_n$ are positive, negative, positive, ..., and positive, respectively, the bit string generation unit 115a generates a bit string "1, 0, 1, ..., 1".

Based on the coordinates acquired from the generalized inverse stereographic projection unit 112a, the bit string generation unit 115a generates a bit string, and outputs the bit string to the bit string storage area 132.

Based on the feature value vector stored in the query storage unit 124 and the parameters p, $x_o$, and d that have been set, the generalized inverse stereographic projection unit 112b performs the inverse stereographic projection, and calculates coordinates on the hypersphere S corresponding to the feature value vector. The generalized inverse stereographic projection unit 112b outputs the calculated coordinates to the bit string generation unit 115b.

Based on the coordinates acquired from the generalized inverse stereographic projection unit 112b, the bit string generation unit 115b generates a plurality of bit strings, and outputs the generated bit strings to the bit string storage area 132.

The Hamming distance calculation unit 133 reads the bit string generated by the bit string generation unit 115a and the bit strings generated by the bit string generation unit 115b from the bit string storage area 132, and calculates Hamming distances between the bit strings. A Hamming distance refers to the number of digits that are different from each other as a result of comparison between two binary numbers having the same number of digits. Based on the calculation results of the Hamming distances, the Hamming distance calculation unit 133 ranks the bit strings in ascending order of the Hamming distance to a query bit string. The Hamming distance calculation unit 133 may output higher-ranked bit strings of all the ranked bit strings as bit strings corresponding to the query bit string, or may output the result of the ranking.

Figure 20:
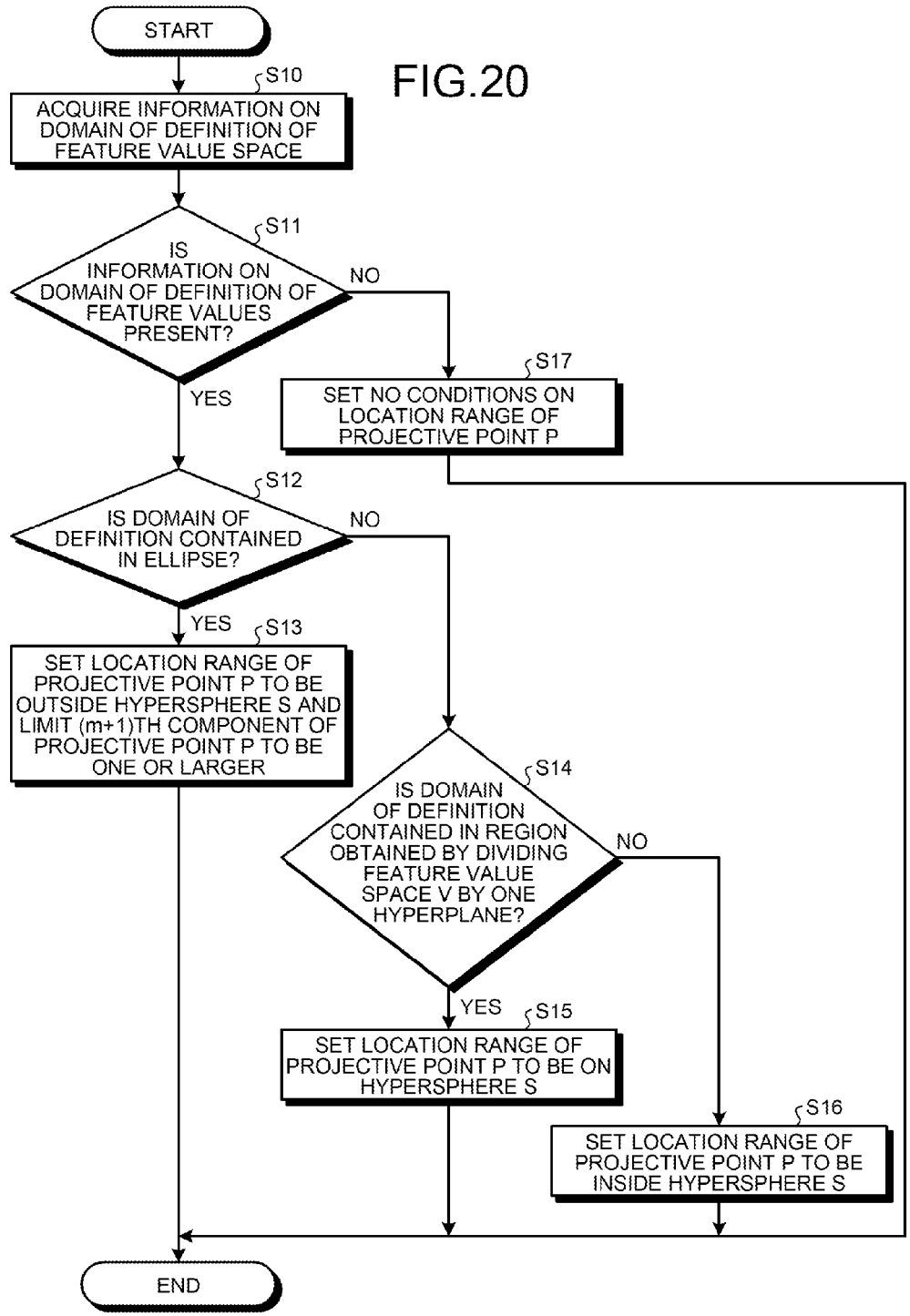
FIG. 20 is a diagram illustrating a first procedure example of setting parameters.

A description will be given of a processing procedure in which the parameter setting unit 111 for the generalized inverse stereographic projection sets the position of the projective point p, the intersection $x_o$, and the parameter d. FIG. 20 is a diagram illustrating an example of a first procedure of setting the parameters. In the processing illustrated in FIG. 20, the parameter setting unit 111 for the generalized inverse stereographic projection sets conditions on the location range of the projective point P.

As illustrated in FIG. 20, the parameter setting unit 111 for the generalized inverse stereographic projection tries to acquire the information on the domain of definition of the feature value space (Step S10). If the information on the domain of definition of the feature value space is not present (No at Step S11), the parameter setting unit 111 for the generalized inverse stereographic projection does not set the conditions on the location range of the projective point P (Step S17), and ends the process.

If the information on the domain of definition of the feature value space is present (Yes at Step S11) and the domain of definition is contained in the ellipse (Yes at Step S12), the parameter setting unit 111 for the generalized inverse stereographic projection sets the location range of the projective point P to be outside the hypersphere S and limits the (m+1)th component of the projective point P to be one or larger (Step S13). If the information on the domain of definition of the feature value space is present (Yes at Step S11) but the domain of definition is not contained in the ellipse (No at Step S12), the parameter setting unit 111 for the generalized inverse stereographic projection performs processing at Step S14.

If, at Step S14, the domain of definition is contained in the region obtained by dividing the feature value space V by one hyperplane (Yes at Step S14), the parameter setting unit 111 for the generalized inverse stereographic projection sets the location range of the projective point P to be on the hypersphere S (Step S15). If the domain of definition is not contained in the region obtained by dividing the feature value space V by one hyperplane (No at Step S14), the parameter setting unit 111 for the generalized inverse stereographic projection sets the location range of the projective point P to be inside the hypersphere S (Step S16).

Figure 21:
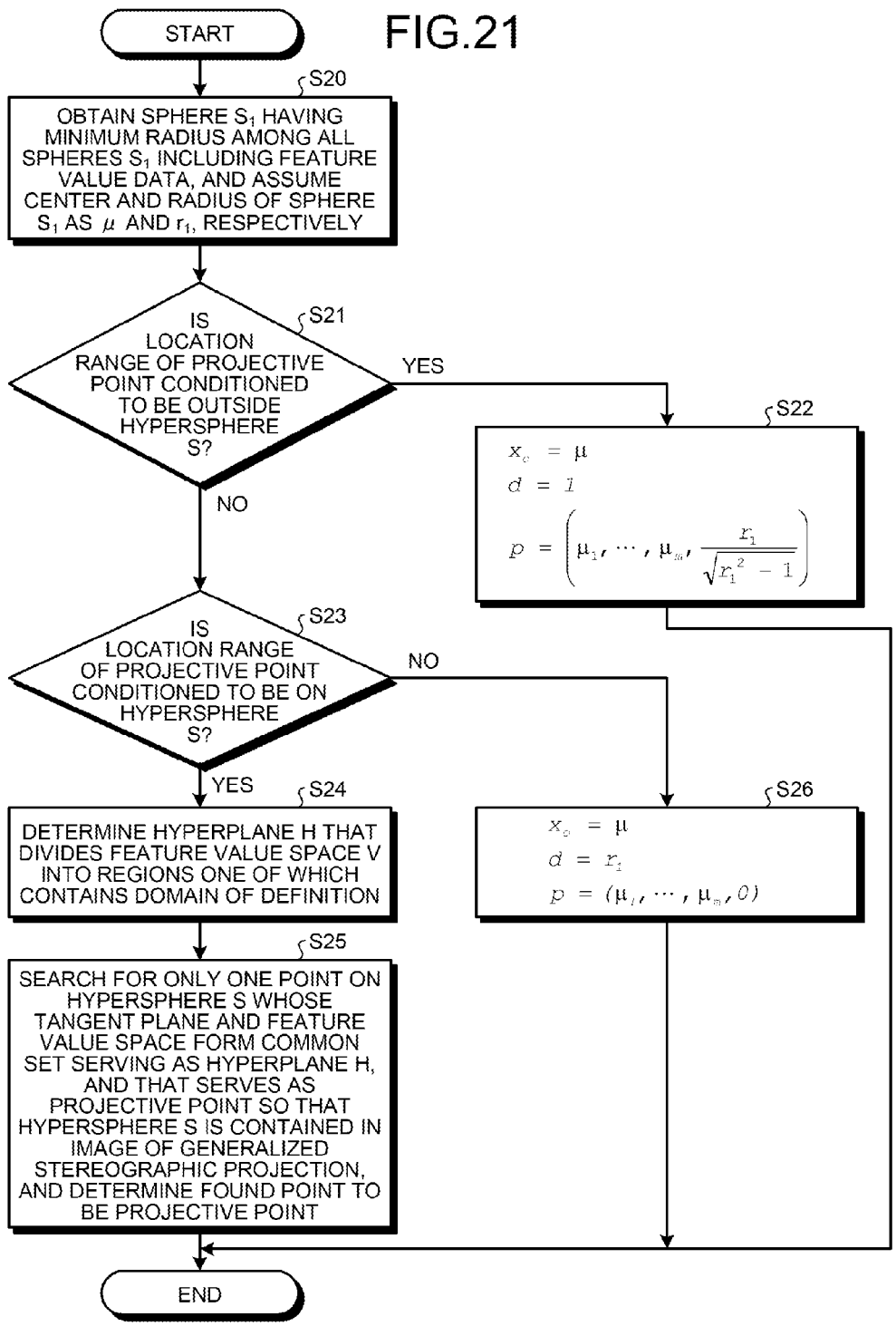
FIG. 21 is a diagram illustrating a second procedure example of setting the parameters.

Using FIG. 21, a description will be given of a processing procedure of setting the projective point based on the location range of the projective point P that has been conditioned by the processing illustrated in FIG. 20. FIG. 21 is a diagram illustrating an example of a second procedure of setting the parameters. The parameter setting unit 111 for the generalized inverse stereographic projection obtains the sphere $S_1$ having the minimum radius among all spheres $S_1$ including the feature value data, and assumes the center and the radius of the sphere $S_1$ as μ and $r_1$, respectively (Step S20).

If the location range of the projective point is conditioned to be outside the hypersphere S (Yes at Step S21), the parameter setting unit 111 for the generalized inverse stereographic projection sets the parameters as follows: $X_o = \mu$; d=1; and p=$(\mu_1, \ldots, \mu_m, r_1/\{r_1^2 - 1\}^{1/2})$ (Step S22). If the location range of the projective point is not conditioned to be outside the hypersphere S (No at Step S21), the parameter setting unit 111 for the generalized inverse stereographic projection performs processing at Step S23.

If the location range of the projective point is conditioned to be on the hypersphere S (Yes at Step S23), the parameter setting unit 111 for the generalized inverse stereographic projection determines the hyperplane H that divides the feature value space V into regions one of which contains the domain of definition (Step S24). Moreover, the parameter setting unit 111 for the generalized inverse stereographic projection searches for a point on the hypersphere S whose tangent plane and the feature value space form a common set serving as the hyperplane H, and that serves as a projective point so that the spheres $S_1$ are contained in the image of the generalized stereographic projection. The parameter setting unit 111 for the generalized inverse stereographic projection determines the only one point on the hypersphere S to be the projective point (Step S25). At this time, the parameter setting unit 111 for the generalized inverse stereographic projection sets the parameters p, $x_o$, and d to the coordinates of the projective point P lying in the position where the tangent plane is tangent to the hypersphere S, the intersection $x_o$ of the hypersphere S set in the space W, and d for the north pole $S_N$ of the hypersphere S, respectively.

If the location range of the projective point is not conditioned to be on the hypersphere S (No at Step S23), the parameter setting unit 111 for the generalized inverse stereographic projection sets the parameters as follows: $X_o=\mu$; $d=r_1$; and $p=(\mu_1, \ldots, \mu_m, 0)$ (Step S26).

In this manner, the processing as the method for classification executed by a computer is performed in which the position of the projective point is set based on the information on the domain of definition of the feature value space, and the position of the projective point thus set is used to project the vector present in the feature value space to the sphere present in a space of dimensions higher by at least one dimension than that of the feature value space. A similarity search using the feature value vector can be accurately performed by setting the projective point according to the domain of definition, and performing the generalized inverse stereographic projection based on the projective point thus set.

The setting process sets the position of the sphere based on the information on the domain of definition of the feature value space. This processing allows the similarity search using the feature value vector to be accurately performed.

If the domain of definition of the feature value space is contained in the elliptic region, the setting process sets the projective point outside the sphere in a position on the side opposite to the feature value space across the sphere. If the domain of definition of the feature value space is contained in a region obtained by dividing the feature value space by one plane, the setting process sets the projective point on the surface of the sphere. As a result, only a requested region in the feature value space V can be projected on the spherical surface by setting the projective point according to the shape of the domain of definition.

[b] Second Embodiment

Figure 22:
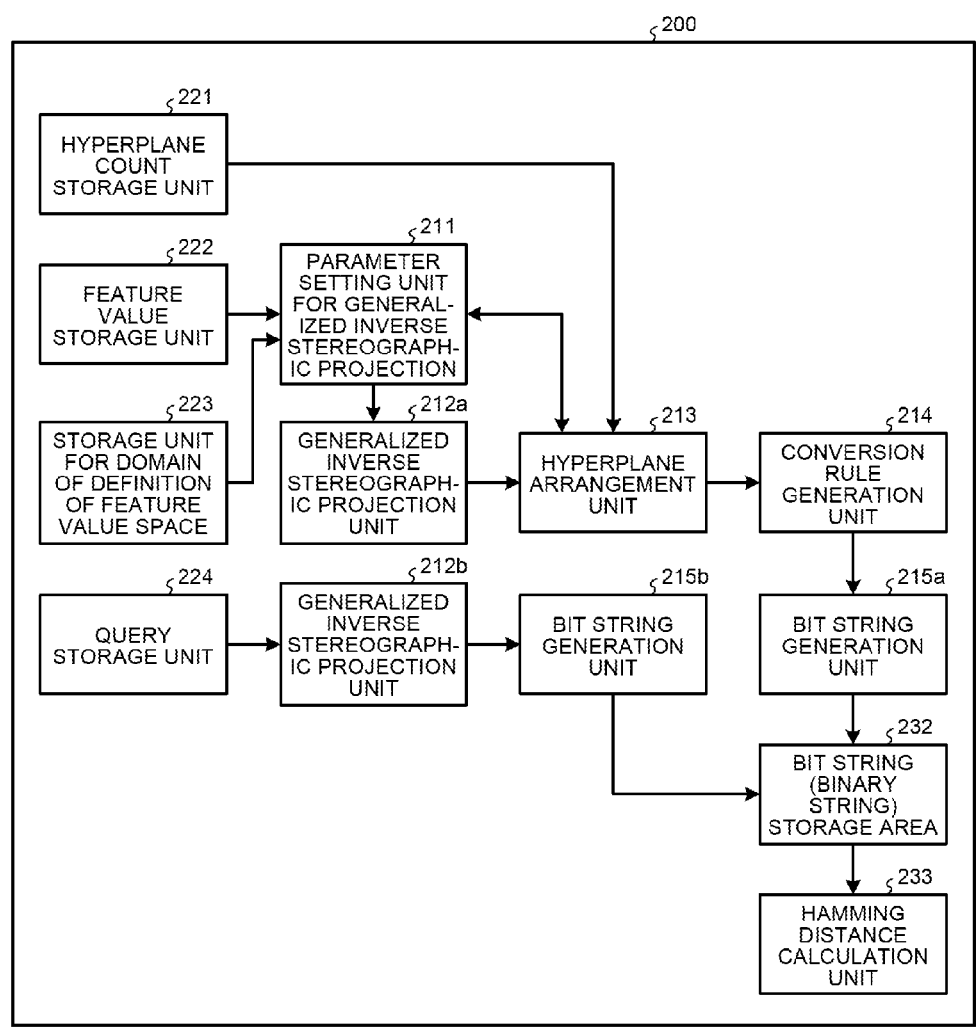
FIG. 22 is a diagram illustrating the system configuration of a classification device according to a second embodiment of the present invention.

The system configuration of a classification device 200 will be described using FIG. 22. FIG. 22 is a diagram illustrating the system configuration of the classification device according to a second embodiment of the present invention. As illustrated in the example of FIG. 22, the classification device 200 includes a hyperplane count storage unit 221, a feature value storage unit 222, a storage unit 223 for a domain of definition of a feature value space, a query storage unit 224, and a bit string storage area 232. Each of the storage units corresponds to a storage device, such as a semiconductor memory device (such as a RAM, a ROM, or a flash memory), a hard disk, or an optical disc.

The classification device 200 also includes a parameter setting unit 211 for generalized inverse stereographic projection, a generalized inverse stereographic projection unit 212a, a hyperplane arrangement unit 213, a conversion rule generation unit 214, and a bit string generation unit 215a. The classification device 200 further includes a generalized inverse stereographic projection unit 212b, a bit string generation unit 215b, and a Hamming distance calculation unit 233. The function of each of the processing units can be implemented by an integrated circuit, such as an ASIC or an FPGA. The function of each of the processing units can also be implemented by, for example, execution of a certain program by a CPU. The parameter setting unit 211 for the generalized inverse stereographic projection is an example of the setting unit. The generalized inverse stereographic projection unit 212a is an example of the projection unit.

The data structure of each of the processing units is the same as that of the first embodiment, so that the description thereof is omitted.

Based on the domain of definition that has been set, the parameter setting unit 211 for the generalized inverse stereographic projection determines the position of the projective point p, the intersection coordinates $x_o$ between the straight line connecting the north and south poles and the feature value space, and the parameter d.

The position of the projective point in the space W is set based on the following three broadly classified limitations according to the domain of definition.

The parameter setting unit 211 for the generalized inverse stereographic projection sets a first limitation that limits the projective point P to be set above the hypersphere S in the space W if the domain of definition of the feature values is contained in an ellipse. For example, the parameter setting unit 211 for the generalized inverse stereographic projection limits the location range of the projective point P to be outside the hypersphere S. The parameter setting unit 211 for the generalized inverse stereographic projection also limits the (m+1)th component of the projective point P to be one or larger. For example, FIG. 4 illustrates the example of limiting the projective point P to be set above the hypersphere S.

Based on the first limitation, the parameter setting unit 211 for the generalized inverse stereographic projection sets the position of the projective point p above the hypersphere S. The parameter setting unit 211 for the generalized inverse stereographic projection sets the position of the projective point p above the hypersphere S so that the image of the generalized stereographic projection of the hypersphere S contains the domain of definition of the feature values, as described below.

The parameter setting unit 211 for the generalized inverse stereographic projection obtains a mean value $\mu$ of the feature value data and a square root $\sigma$ of the maximum eigenvalue of a variance-covariance matrix. For example, the parameter setting unit 211 for the generalized inverse stereographic projection sets, when it has set $x_o$ to $\mu$ and d to one, the position of the projective point p to $(\mu_1, \ldots, \mu_m, 5\sigma/\{(5\sigma)^2-1\}^{1/2})$.

The parameter setting unit 211 for the generalized inverse stereographic projection sets a second limitation that limits the projective point P to be set on the surface of the hypersphere S if the domain of definition is contained in one of divided regions obtained by dividing the feature value space V by the hyperplane H. For example, FIG. 5 illustrates the example of limiting the projective point P to be set on the surface of the hypersphere S.

The parameter setting unit 211 for the generalized inverse stereographic projection sets the position of the projective point based on the second limitation. The parameter setting unit 211 for the generalized inverse stereographic projection obtains a point on the hypersphere S whose tangent plane and the feature value space form a common set serving as the hyperplane H, and that serves as a projective point so that all the spheres $S_1$ including the feature value data are contained in the image of the generalized stereographic projection, and the parameter setting unit 211 for the generalized inverse stereographic projection determines the obtained point to be the projective point P. At this time, the parameter setting unit 211 for the generalized inverse stereographic projection sets the parameter p to the coordinates of the projective point P lying in the position where the tangent plane is tangent to the hypersphere S. The parameter setting unit 211 for the generalized inverse stereographic projection sets the parameters $x_o$ and d to the intersection coordinates $X_o$ between the straight line connecting the north and the south poles $S_N$ and $S_S$ of the hypersphere S set in the space W and the feature value space, and to the parameter d for the north pole $S_N$ of the hypersphere S, respectively.

The parameter setting unit 211 for the generalized inverse stereographic projection sets a third limitation that limits the projective point P to be set inside the hypersphere S if no domain of definition can be identified in the feature value space V. The parameter setting unit 211 for the generalized inverse stereographic projection sets the position of the projective point p inside the hypersphere S based on the third limitation. For example, FIG. 6 illustrates the example of limiting the projective point P to be set inside the hypersphere S. The parameter setting unit 211 for the generalized inverse stereographic projection sets the position of the projective point p as described below.

The parameter setting unit 211 for the generalized inverse stereographic projection obtains the mean value $\mu$ of the feature value data and the square root $\sigma$ of the maximum eigenvalue of the variance-covariance matrix. For example, the parameter setting unit 211 for the generalized inverse stereographic projection sets, when it has set $x_o$ to $\mu$ and d to $5\sigma$, the position of the projective point p to $(\mu_1, \ldots, \mu_m, 0)$. The parameter setting unit 211 for the generalized inverse stereographic projection outputs the parameters p, $x_o$, d thus set to a generalized inverse stereographic projection unit 212a. The processing performed in other processing units is the same as that of the first embodiment, so that the description thereof is omitted.

Figure 23:
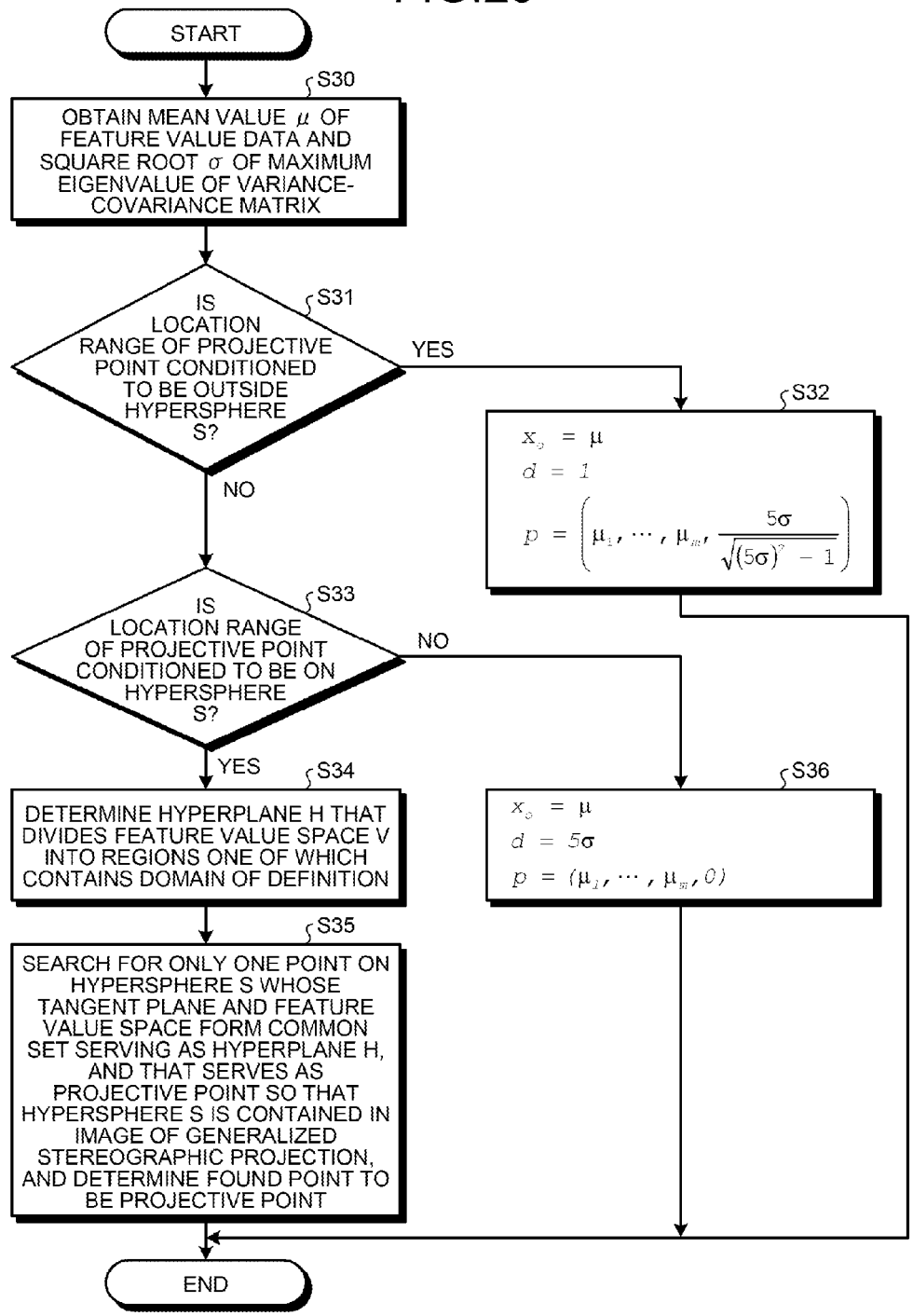
FIG. 23 is a diagram illustrating a third procedure example of setting the parameters.

A processing procedure of the classification device 200 according to the second embodiment will be described using FIG. 23. The processing of setting conditions on the location range of the projective point P is the same as that of the first embodiment, so that the description thereof will be omitted. FIG. 23 is a diagram illustrating an example of a third procedure of setting the parameters. The parameter setting unit 211 for the generalized inverse stereographic projection obtains the mean value $\mu$ of the feature value data and the square root $\sigma$ of the maximum eigenvalue of the variance-covariance matrix (Step S30).

If the location range of the projective point is conditioned to be outside the hypersphere S (Yes at Step S31), the parameter setting unit 211 for the generalized inverse stereographic projection sets the parameters as follows: $X_o=\mu$; d=1; and p=$(\mu_1, \ldots, \mu_m, 5\sigma/\{(5\sigma)^2-1\}^{1/2})$ (Step S32). If the location range of the projective point is not conditioned to be outside the hypersphere S (No at Step S31), the parameter setting unit 211 for the generalized inverse stereographic projection performs processing at Step S33.

If the location range of the projective point is conditioned to be on the hypersphere S (Yes at Step SE3), the parameter setting unit 211 for the generalized inverse stereographic projection determines the hyperplane H that divides the feature value space V into regions one of which contains the domain of definition (Step S34). Moreover, the parameter setting unit 211 for the generalized inverse stereographic projection searches for a point on the hypersphere S whose tangent plane and the feature value space form a common set serving as the hyperplane H, and that serves as a projective point so that the domain of definition of the feature value space is contained in the image of the generalized stereographic projection. The parameter setting unit 211 for the generalized inverse stereographic projection determines the only one point on the hypersphere S satisfying the above-described conditions to be the projective point (Step S35). At this time, the parameter setting unit 211 for the generalized inverse stereographic projection sets the parameters p, $x_o$, and d to the coordinates of the projective point P lying in the position where the tangent plane is tangent to the hypersphere S, the intersection $x_o$ of the hypersphere S set in the space W, and d for the north pole $S_N$ of the hypersphere S, respectively.

If the location range of the projective point is not conditioned to be on the hypersphere S (No at Step S33), the parameter setting unit 211 for the generalized inverse stereographic projection sets the parameters as follows: $X_o=\mu$; d=$5\sigma$; and p=$(\mu_1, \ldots, \mu_m, 0)$ (Step S36).

In this manner, by setting the parameters p, $x_o$, and d based on the square root $\sigma$ of the maximum eigenvalue of the variance-covariance matrix, the domain of definition of the feature value space can be identified, and the similarity search using the feature value vector can be accurately performed.

[c] Third Embodiment

Figure 24:
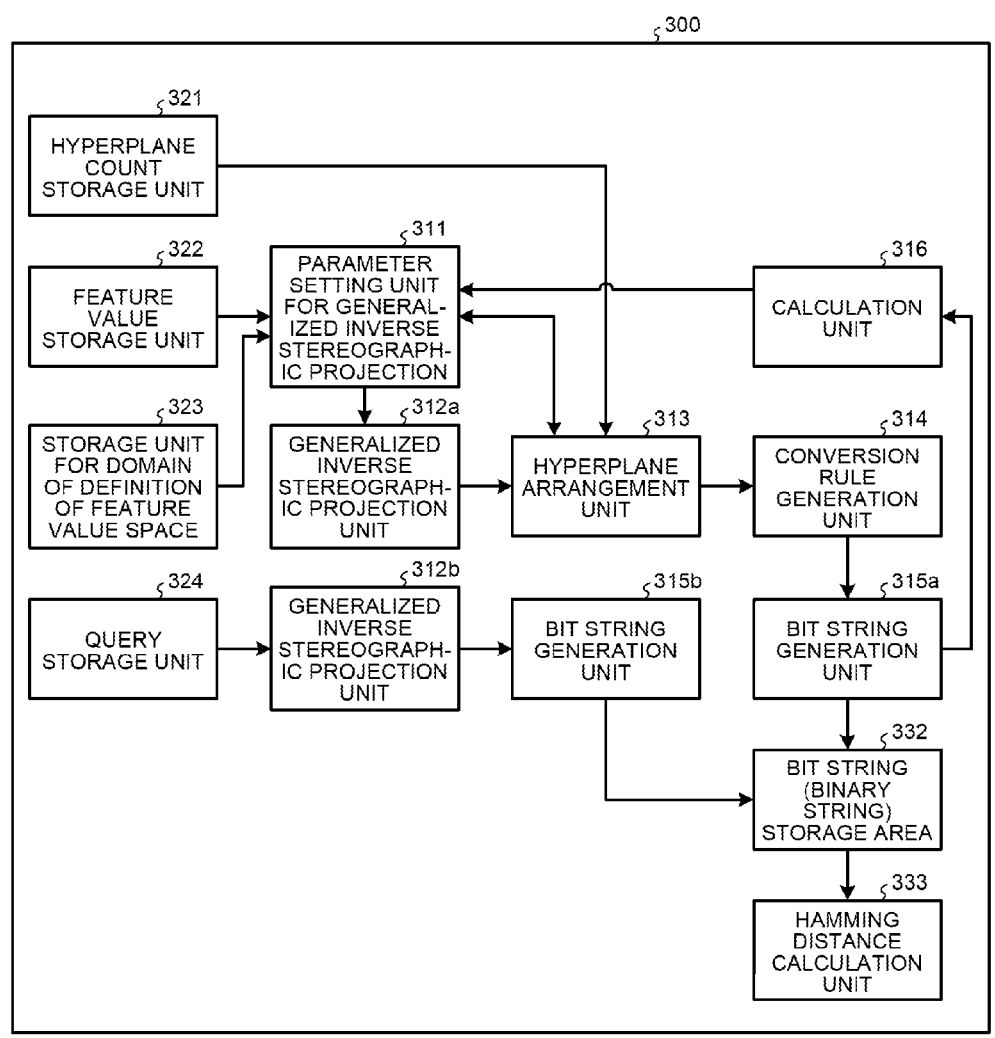
FIG. 24 is a diagram illustrating the system configuration of a classification device according to a third embodiment of the present invention.

The system configuration of a classification device 300 will be described using FIG. 24. FIG. 24 is a diagram illustrating the system configuration of the classification device according to a third embodiment of the present invention. As illustrated in the example of FIG. 24, the classification device 300 includes a hyperplane count storage unit 321, a feature value storage unit 322, a storage unit 323 for a domain of definition of a feature value space, a query storage unit 324, and a bit string storage area 332. Each of the storage units corresponds to a storage device, such as a semiconductor memory device (such as a RAM, a ROM, or a flash memory), a hard disk, or an optical disc.

The classification device 300 also includes a parameter setting unit 311 for generalized inverse stereographic projection, a generalized inverse stereographic projection unit 312a, a hyperplane arrangement unit 313, a conversion rule generation unit 314, a bit string generation unit 315a, and a calculation unit 316. The classification device 300 further includes a generalized inverse stereographic projection unit 312b, a bit string generation unit 315b, and a Hamming distance calculation unit 333. The function of each of the processing units can be implemented by an integrated circuit, such as an ASIC or an FPGA. The function of each of the processing units can also be implemented by, for example, execution of a certain program by a CPU. The parameter setting unit 311 for the generalized inverse stereographic projection is an example of the setting unit. The generalized inverse stereographic projection unit 312a is an example of the projection unit. The following describes the processing units.

The parameter setting unit 311 for the generalized inverse stereographic projection determines a parameter string A that has the highest approximation accuracy among a plurality of parameter strings that include the position of the projective point p, the intersection coordinates $x_o$ between the straight line connecting the north and south poles and the feature value space, and the parameter d. Descriptions will be given of three specific examples of processing performed in the parameter setting unit 311 for the generalized inverse stereographic projection to set the parameter string having high approximation accuracy. A description will be given of an example in which the parameter setting unit 311 for the generalized inverse stereographic projection sets the parameter string having high approximation accuracy using a "hill-climbing search" technique.

The parameter setting unit 311 for the generalized inverse stereographic projection identifies initial values of the parameter string A based on the procedure according to the first embodiment. The calculation unit 316 acquires bit strings of feature value vectors calculated based on the initial values from the bit string generation unit 315a. The calculation unit 316 calculates the approximation accuracy based on the respective feature value vectors and the bit strings. For example, the approximation accuracy is calculated by Expression (8) or (9).

$$m_1 = \frac{|R_k \cap Q_{k'}|}{|Q_{k'}|} \quad (8)$$

$$m_2 = \frac{|R_k \cap Q_{k'}|}{|R_k|} \quad (9)$$

An example of processing to calculate the approximation accuracy will be described. The calculation unit 316 selects out a feature value vector $v_a$ from the feature value storage unit 322, and identifies feature value vectors having the first to the m-th smallest distance to the feature value vector $v_a$ in the feature value space. The feature value vectors having the smallest distances to the feature value vector $v_a$ are denoted as feature value vectors $v_{a1}$ to $v_{aM}$. For example, in Expression (8), a number M of the feature value vectors corresponds to $|R_k|$.

The calculation unit 316 identifies, from the bit strings acquired from the bit string generation unit 315a, bit strings having the first to the m-th smallest distance to a bit string corresponding to the feature value vector $v_a$, and identifies feature value vectors $v_{b1}$ to $v_{bM}$ corresponding to the identified bit strings. The calculation unit 316 counts how many feature value vectors of the feature value vectors $v_{b1}$ to $v_{bM}$ are the same vectors as those among the feature value vectors $v_{a1}$ to $v_{aM}$. The number thus counted corresponds to $|R_k \cap Q_{k'}|$ in Expression (8).

The parameter setting unit 311 for the generalized inverse stereographic projection sets I proximate values $B_i$ of the parameter string A in a parameter space. The calculation unit 316 calculates the approximation accuracy of each of the proximate values $B_i$. The parameter setting unit 311 for the generalized inverse stereographic projection sets the parameter string having the highest approximation accuracy as the parameter string A. The parameter setting unit 311 for the generalized inverse stereographic projection repeats the above-described processing to identify the parameter string having the highest approximation accuracy.

Bit strings are generated based on the final parameter string A obtained after the parameter setting unit 311 for the generalized inverse stereographic projection has repeated the above-described processing a predetermined number of times, and the Hamming distance calculation unit 333 calculates Hamming distances between the bit strings stored in the bit string storage area 332.

A description will be given of an example in which the parameter setting unit 311 for the generalized inverse stereographic projection sets the parameter string having high approximation accuracy using a "Markov chain Monte Carlo method". The parameter setting unit 311 for the generalized inverse stereographic projection identifies the parameter string A based on the procedure according to the first embodiment. The calculation unit 316 acquires the bit strings of the respective feature value vectors generated based on the parameter string A from the bit string generation unit 315a.

Based on the respective feature value vectors and the bit strings, the calculation unit 316 performs approximate similarity search, and calculates approximation accuracy X1 of the parameter string A. For example, the approximation accuracy is calculated by Expression (8) in the same way as the hill-climbing search technique.

The parameter setting unit 311 for the generalized inverse stereographic projection sets a proximate value B close to the parameter string A. Based on the respective feature value vectors and the bit strings, the calculation unit 316 performs the approximate similarity search, and calculates approximation accuracy X2 at the proximate value B.

The parameter setting unit 311 for the generalized inverse stereographic projection generates a random number, and if the value of the random number is smaller than X2/X1, sets the parameter string A to the proximate value B. If the value of the generated random number is not smaller than X2/X1, the parameter setting unit 311 for the generalized inverse stereographic projection leaves the position of the parameter string unchanged. The parameter setting unit 311 for the generalized inverse stereographic projection performs the above-described processing a predetermined number of times.

A description will be given of an example in which the parameter setting unit 311 for the generalized inverse stereographic projection sets the parameter string having high approximation accuracy using "swarm intelligence". The parameter setting unit 311 for the generalized inverse stereographic projection identifies a plurality of parameter strings. For example, the parameter setting unit 311 for the generalized inverse stereographic projection identifies the positions of the parameter strings by obtaining the parameter strings using the same method as that of the first embodiment, and obtaining a plurality of positions close to the positions of the parameter strings.

The parameter setting unit 311 for the generalized inverse stereographic projection acquires, from the bit string generation unit 315a, the bit strings of the respective feature value vectors calculated based on the positions of the parameter strings. The parameter setting unit 311 for the generalized inverse stereographic projection assumes each of the parameter strings as the position of a charged particle, and performs a charged system search using an objective function so as to identify the position of the parameter string having the highest approximation accuracy.

Assuming the position of each of the parameter strings as the position of a charged particle enables setting of a limitation that prevents the parameter strings from coming close to each other when moved in the parameter space. Thus, the parameter string A having the highest approximation accuracy can be identified in a position distant from the others by a predetermined distance. The Hamming distance calculation unit 333 calculates the Hamming distance using the parameter string A.

The objective function of the charged system search is a function that calculates the approximation accuracy when the position of the parameter string is given, and calculates the approximation accuracy through the same processing as that of the hill-climbing search technique and the Markov chain Monte Carlo method described above.

A processing procedure of the classification device 300 according to the third embodiment will be described. The processing of identifying the parameter strings will be described below in the following order: the parameter string identification processing using the hill-climbing search technique, the parameter string identification processing using the Markov chain Monte Carlo method, and the parameter string identification processing using the swarm intelligence.

Figure 25:
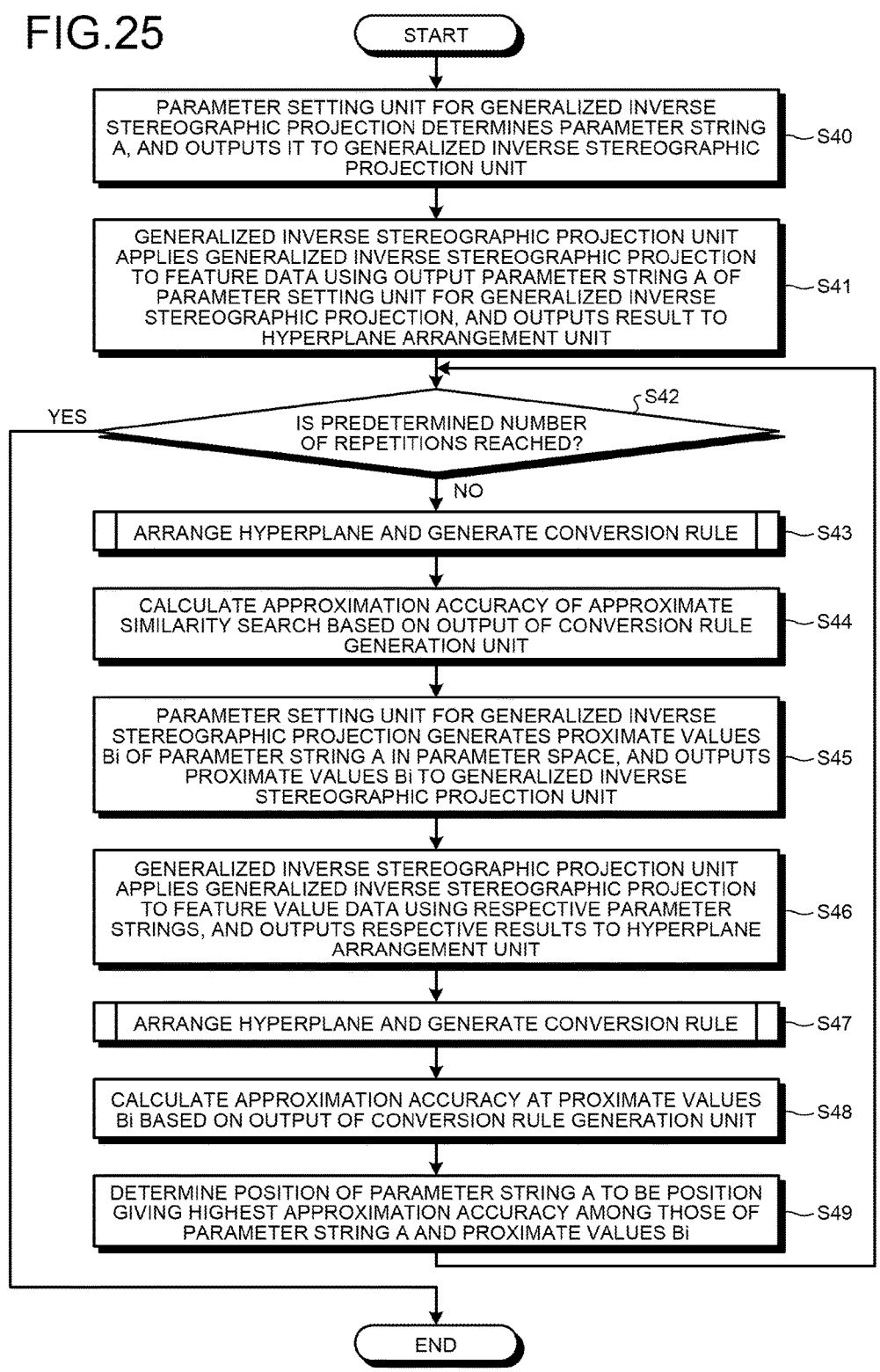
FIG. 25 is a diagram illustrating a fourth procedure example of setting parameters.

A description will first be given of an example of the parameter string identification processing using the hill-climbing search technique. FIG. 25 is a diagram illustrating a fourth procedure example of setting the parameters. As illustrated in FIG. 25, the parameter setting unit 311 for the generalized inverse stereographic projection determines the parameter string A, and outputs the parameter string A to the generalized inverse stereographic projection unit 312a (Step S40). The generalized inverse stereographic projection unit 312a applies the generalized inverse stereographic projection to the feature value data using the output parameter string A of the parameter setting unit 311 for the generalized inverse stereographic projection, and outputs the result to the hyperplane arrangement unit 313 (Step S41).

If the parameter setting unit 311 for the generalized inverse stereographic projection has repeated processing from Steps S43 to S49 a predetermined number of times (Yes at Step S42), the process ends. If the number of repetition of the processing from Steps S43 to S49 is smaller than the predetermined number (No at Step S42), the parameter setting unit 311 for the generalized inverse stereographic projection performs processing at Step S43.

The hyperplane arrangement unit 313 arranges a hyperplane, and the conversion rule generation unit 314 generates a conversion rule (Step S43). Based on the output of the conversion rule generation unit 314, the calculation unit 316 calculates the approximation accuracy of the approximate similarity search (Step S44). The parameter setting unit 311 for the generalized inverse stereographic projection generates the proximate values $B_i$ of the parameter string A in the parameter space, and outputs the proximate values $B_i$ to the generalized inverse stereographic projection unit 312a (Step S45).

The generalized inverse stereographic projection unit 312a applies the generalized inverse stereographic projection to the feature value data using the respective parameter strings, and outputs the respective results to the hyperplane arrangement unit 313 (Step S46). The hyperplane arrangement unit 313 arranges a hyperplane, and the conversion rule generation unit 314 generates a conversion rule (Step S47). Based on the output of the conversion rule generation unit 314, the calculation unit 316 calculates the approximation accuracy at the respective proximate values $B_i$ (Step S48). The parameter setting unit 311 for the generalized inverse stereographic projection determines the position of the parameter string A to be a position giving the highest approximation accuracy among those of the parameter string A and the proximate values $B_i$ (Step S49).

Figure 26:
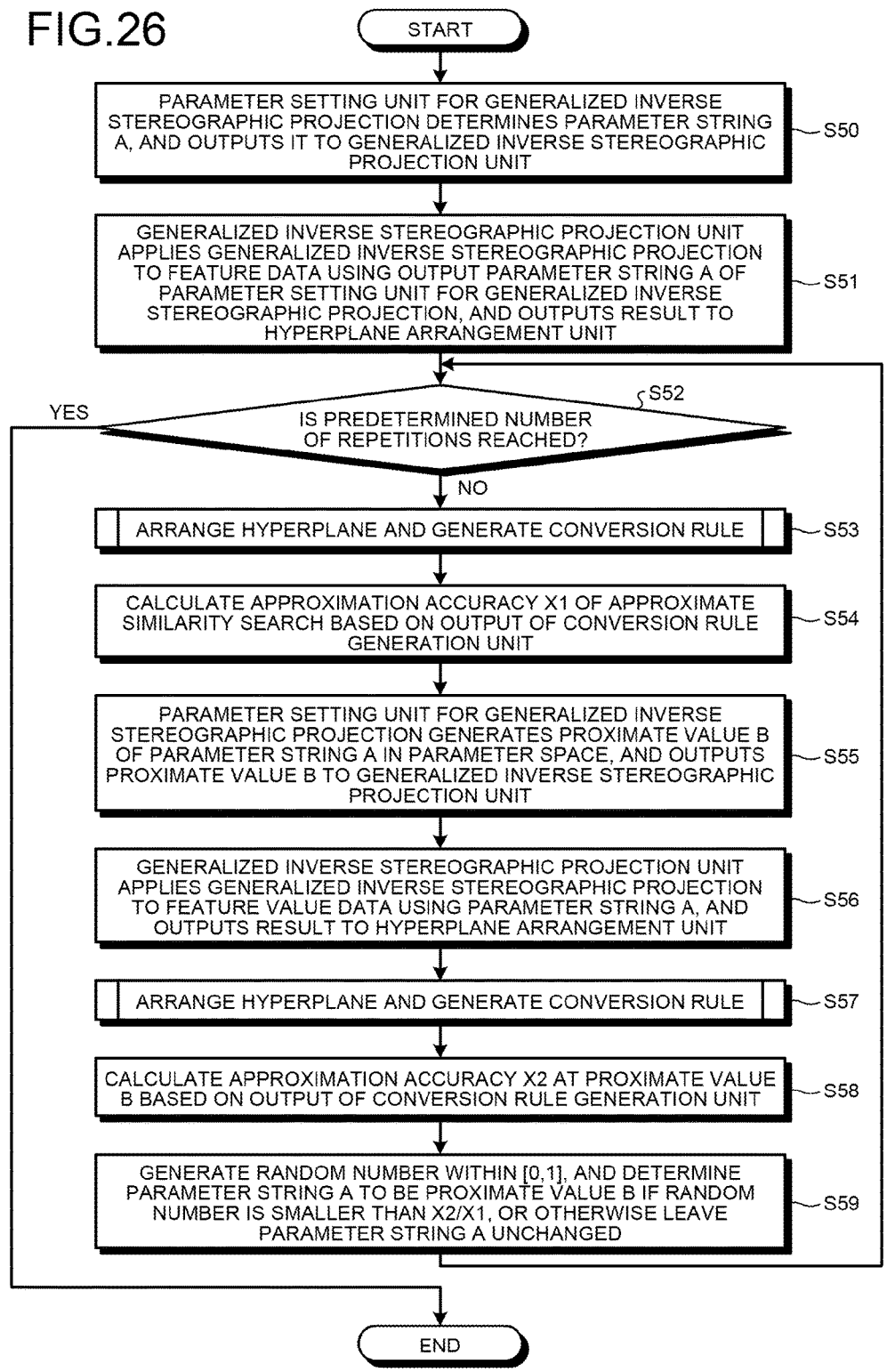
FIG. 26 is a diagram illustrating a fifth procedure example of setting the parameters.

A description will be given of an example of the parameter string identification processing using the Markov chain Monte Carlo method. FIG. 26 is a diagram illustrating a fifth procedure example of setting the parameters. As illustrated in FIG. 26, the parameter setting unit 311 for the generalized inverse stereographic projection determines the parameter string A, and outputs the result to the generalized inverse stereographic projection unit 312a (Step S50). The generalized inverse stereographic projection unit 312a applies the generalized inverse stereographic projection to the feature value data using the output parameter string A of the parameter setting unit 311 for the generalized inverse stereographic projection, and outputs the result to the hyperplane arrangement unit 313 (Step S51).

If the parameter setting unit 311 for the generalized inverse stereographic projection has repeated processing from Steps S53 to S59 a predetermined number of times (Yes at Step S52), the process ends. If the number of repetition of the processing from Steps S53 to S59 is smaller than the predetermined number (No at Step S52), the parameter setting unit 311 for the generalized inverse stereographic projection performs processing at Step S53.

The hyperplane arrangement unit 313 arranges a hyperplane, and the conversion rule generation unit 314 generates a conversion rule (Step S53). Based on the output of the conversion rule generation unit 314, the calculation unit 316 calculates the approximation accuracy X1 of the approximate similarity search (Step S54). The parameter setting unit 311 for the generalized inverse stereographic projection generates the proximate value B of the parameter string A in the parameter space, and outputs the proximate value B to the generalized inverse stereographic projection unit 312a (Step S55).

The generalized inverse stereographic projection unit 312a applies the generalized inverse stereographic projection to the feature value data using the parameter string mentioned above, and outputs the result to the hyperplane arrangement unit 313 (Step S56). The hyperplane arrangement unit 313 arranges a hyperplane, and the conversion rule generation unit 314 generates a conversion rule (Step S57). Based on the output of the conversion rule generation unit 314, the calculation unit 316 calculates the approximation accuracy X2 at the proximate value B (Step S58). The parameter setting unit 311 for the generalized inverse stereographic projection generates a random number in the range of [0,1], and determines the parameter string A to be positioned at the proximate value B if the random number is smaller than X2/X1, or otherwise leaves the parameter string A unchanged (Step S59).

Figure 27:
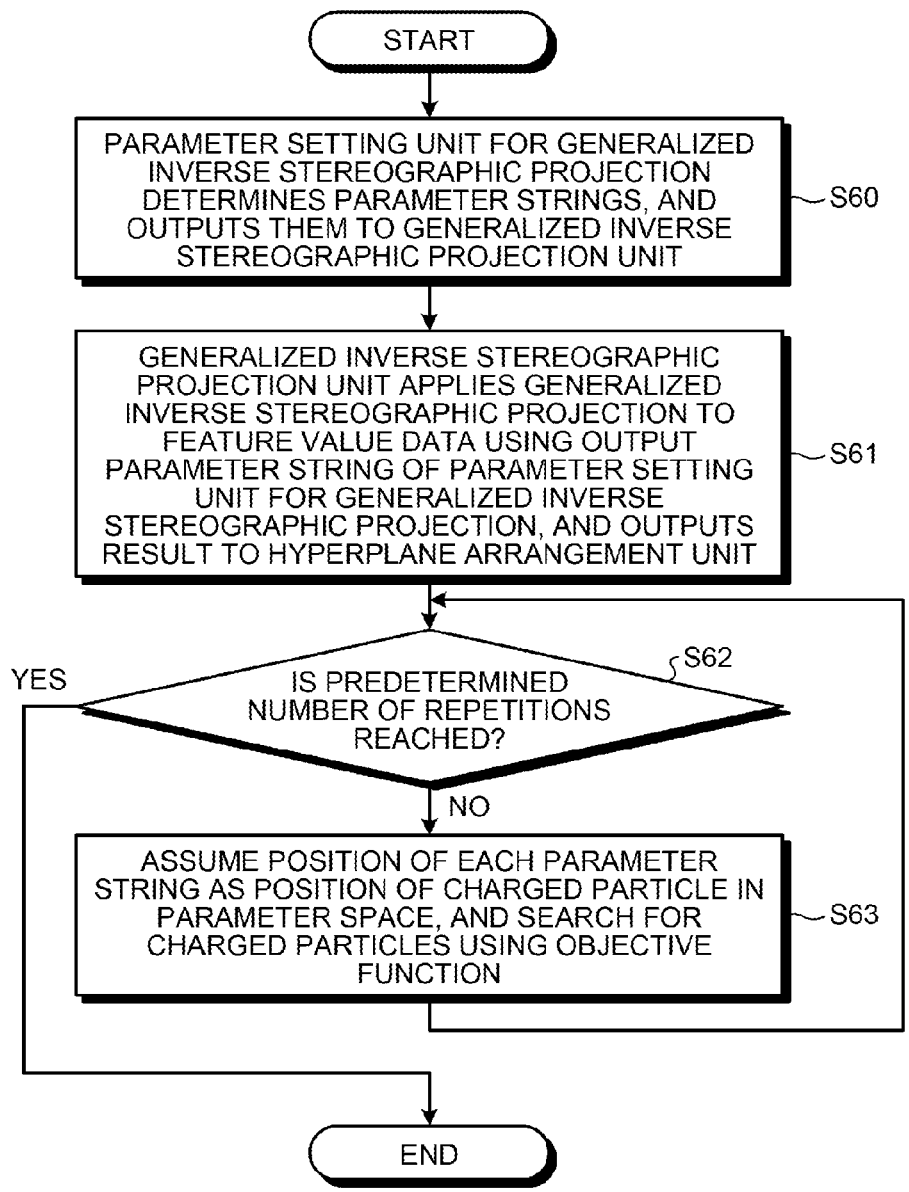
FIG. 27 is a diagram illustrating a sixth procedure example of setting parameters.

A description will be given of an example of the parameter string identification processing using the swarm intelligence. FIG. 27 is a diagram illustrating a sixth procedure example of setting parameters. As illustrated in FIG. 27, the parameter setting unit 311 for the generalized inverse stereographic projection determines a plurality of parameter strings, and outputs the results to the generalized inverse stereographic projection unit 312a (Step S60). The generalized inverse stereographic projection unit 312a applies the generalized inverse stereographic projection to the feature value data using the output parameter string of the parameter setting unit 311 for the generalized inverse stereographic projection, and outputs the result to the hyperplane arrangement unit 313 (Step S61).

If the parameter setting unit 311 for the generalized inverse stereographic projection has repeated processing at Step S63 a predetermined number of times (Yes at Step S62), the process ends. If the number of repetition of the processing at Step S63 is smaller than the predetermined number (No at Step S62), the parameter setting unit 311 for the generalized inverse stereographic projection repeats processing at Step S63.

The parameter setting unit 311 for the generalized inverse stereographic projection assumes the position of each of the parameter strings as the position of a charged particle in the parameter space, and searches for charged particles using the objective function (Step S63).

Figure 28:
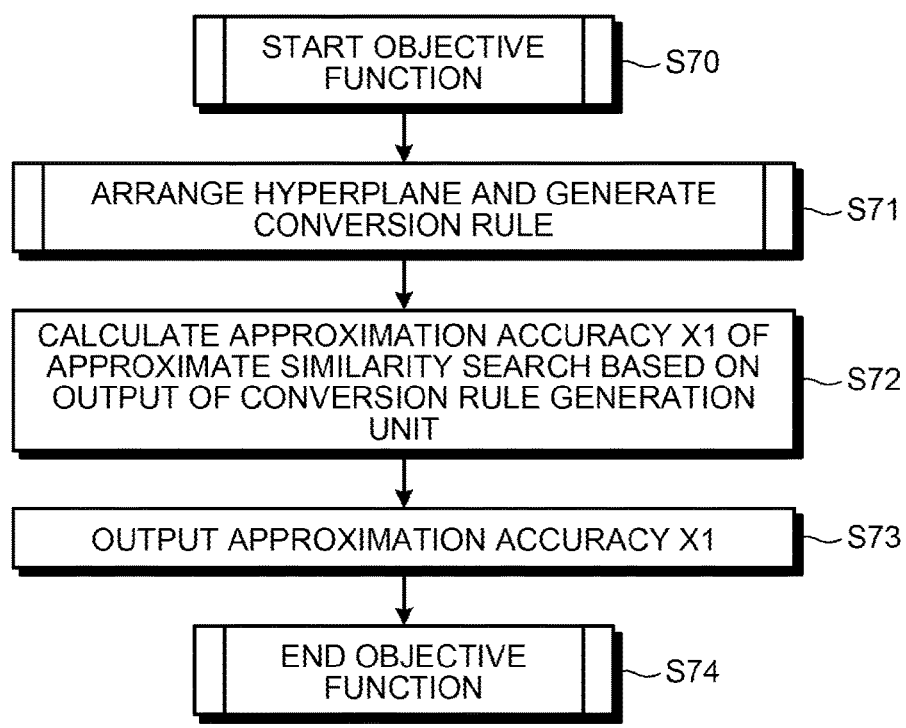
FIG. 28 is a diagram illustrating an example of a processing procedure of an objective function.
Figure 29:
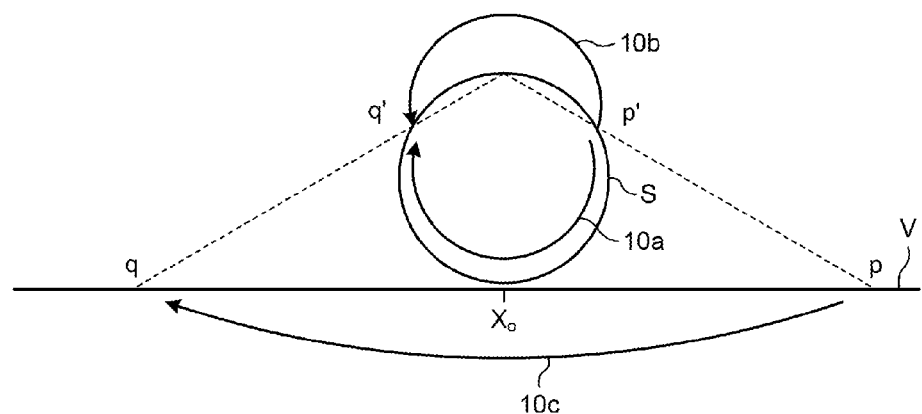
FIG. 29 is a diagram for explaining a shortcut of a point at infinity.

The objective function used in a processing procedure of FIG. 28. FIG. 28 is a diagram illustrating an example of the processing procedure of the objective function. As illustrated in FIG. 28, the parameter setting unit 311 for the generalized inverse stereographic projection of the classification device 300 starts the objective function (Step S70). The hyperplane arrangement unit 313 arranges a hyperplane, and the conversion rule generation unit 314 generates a conversion rule (Step S71). Based on the output of the conversion rule generation unit 314, the calculation unit 316 calculates the approximation accuracy X1 of the approximate similarity search (Step S72). The calculation unit 316 outputs the approximation accuracy X1 (Step S73). The parameter setting unit 311 for the generalized inverse stereographic projection ends the objective function (Step S74).

In this manner, the setting process sets a first parameter by performing once or more times a process of setting the first parameter to a parameter having the highest approximation accuracy among the first parameter including one or more of the position of the projective point set in the sphere and the position of the sphere, and one or more second parameters close to the first parameter in the parameter space. Thus, the similarity search using the feature value vector can be accurately performed by searching for a more appropriate position of the projective point.

The setting process sets the first parameter by performing once or more times a process of setting the first parameter to a second parameter if a value obtained by dividing the approximation accuracy of the second parameter close to the first parameter including one or more of the position of the projective point set in the sphere and the position of the sphere in the parameter space by the approximation accuracy of the first parameter is larger than a random number. Thus, the similarity search using the feature value vector can be accurately performed by searching the position of a projective point giving higher approximation accuracy.

The setting process sets a projective point giving the highest approximation accuracy among a plurality of projective points that are assumed to be charged particles and arranged in the sphere. By assuming the projective points to be the charged particles, the projective points are arranged in a dispersed manner, so that the number of times of search can be reduced.

Figure 30:
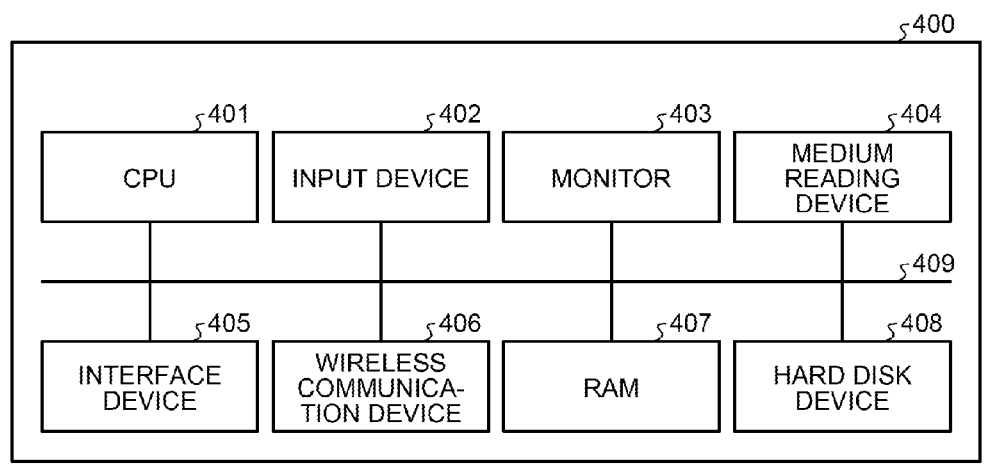
FIG. 30 is a diagram illustrating the hardware configuration of each of the classification devices.

FIG. 30 is a diagram illustrating the hardware configuration of each of the classification devices. As illustrated in FIG. 30, a computer 400 includes a CPU 401 that executes various types of arithmetic processing, an input device 402 that accepts data input from the user, and a monitor 403. The computer 400 also includes a medium reading device 404 that reads programs and the like from a recording medium, an interface device 405 for connecting with other devices, and a wireless communication device 406 for wirelessly connecting with other devices. The computer 400 also includes a random access memory (RAM) 407 that temporarily stores therein various types of information and a hard disk device 408. The devices 401 to 408 are connected to a bus 409.

The hard disk device 408 stores therein, for example, information processing programs having the same functions as those of the processing units illustrated in FIGS. 1, 22, and 24. The hard disk device 408 stores therein various types of data for executing the information processing program.

The CPU 401 executes the various types of processing by reading the programs stored in the hard disk device 408, and loading and executing the programs in the RAM 407. The programs can operate the computer 400 to serve as the processing units illustrated in FIGS. 1, 22, and 24.

The information processing programs described above need not necessarily be stored in the hard disk device 408. For example, the computer 400 may read and execute the programs stored in a storage medium readable by the computer 400. Examples of the storage medium readable by the computer 400 include, but are not limited to, portable recording media such as CD-ROMs, DVDs, and universal serial bus (USB) memories, semiconductor memories such as flash memories, and hard disk drives. The programs may be stored in a device connected to a public line, the Internet, a local area network (LAN), or the like, and read by the computer 400 from the device to be executed.

One of the embodiments of the present invention provides an effect of enabling an accurate similarity search using feature value vectors.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A classification method comprising:
storing information on a domain of definition within a feature value space in a storage unit, using a processor;
setting a position of a projective point in a space whose dimension is higher by at least one dimension than a dimension of the feature value space and in which a sphere is present outside the feature value space, based on the information on a domain of definition within the feature value space stored in the storage unit, a domain in the feature value space to which the sphere is projected using the set position of the projective point being a part of the feature value space, using the processor;
receiving biological information of a user via an input device;
projecting a first vector that represents the biological information of the user, is used as a query and is present in the domain of definition within the feature value space to the sphere by using the set position of the projective point, using the processor;
generating a first bit string that is converted from the projected first vector, using the processor; and
calculating a Hamming distance between the first bit string and each of a second plurality of bit strings that are each generated from other projected vectors of a second plurality of vectors for users that each represent biological information thereof, are registered in a storage unit, and present in the domain of definition within the feature value space, obtaining, from among the second plurality of vectors, vectors that are similar to the first vector, based on the calculated Hamming distance, and determining whether the first vector is registered in the storage unit to authenticate the user, using the processor.

2. The classification method according to claim 1, wherein the setting includes setting a position of the sphere based on the information on the domain of definition within the feature value space, using the processor.

3. The classification method according to claim 1, wherein, when the domain of definition within the feature value space is contained in an elliptic region, the setting includes setting the projective point outside the sphere in a position on a side opposite to the feature value space across the sphere, using the processor.

4. The classification method according to claim 1, wherein, when the domain of definition within the feature value space is contained in a region obtained by dividing the feature value space by one plane, the setting includes setting the projective point on a surface of the sphere, using the processor.

5. The classification method according to claim 1, wherein the setting includes setting a first parameter including the position of the projective point and a position of the sphere by performing once or more times a process of setting the first parameter to a parameter giving a highest approximation accuracy among the first parameter and one or more second parameters close to the first parameter in a parameter space, using the processor.

6. The classification method according to claim 1, wherein the setting includes setting a first parameter including the position of the projective point and a position of the sphere by performing once or more times a process of setting the first parameter to a second parameter close to the first parameter in a parameter space when a value obtained by dividing approximation accuracy of the second parameter by approximation accuracy of the first parameter is larger than a random number, using the processor.

7. The classification method according to claim 1, wherein the setting includes setting a projective point giving a highest approximation accuracy among a plurality of projective points that are dispersedly arranged by assuming the plurality of projective points to be charged particles, using the processor.

8. The classification method according to claim 1, wherein the setting includes setting a position of the projective point in the space, based on information on the domain of definition within the feature value space, so that the domain of definition only is projected to the sphere using the set position of the projective point, using the processor.

9. A classification device comprising:
a processor that executes a process including:
storing information on a domain of definition within a feature value space in a storage unit;
setting a position of a projective point in a space whose dimension is higher by at least one dimension than a dimension of the feature value space and in which a sphere is present outside the feature value space, based on the information on a domain of definition within the feature value space stored in the storage unit, a domain in the feature value space to which the sphere is projected using the set position of the projective point being a part of the feature value space;
receiving biological information of a user via an input device;
projecting a first vector that represents the biological information of the user, is used as a query and is present in the domain of definition within the feature value space to the sphere by using the set position of the projective point;
generating a first bit string that is converted from the projected first vector; and
calculating a Hamming distance between the first bit string and each of a second plurality of bit strings that are each generated from other projected vectors of a second plurality of vectors for users that each represent biological information thereof, are registered in a storage unit, and present in the domain of definition within the feature value space, obtaining, from among the second plurality of vectors, vectors that are similar to the first vector, based on the calculated Hamming distance, and determining whether the first vector is registered in the storage unit to authenticate the user.

10. A non-transitory computer-readable recording medium having stored therein a program that causes a computer to execute a classification process comprising:
storing information on a domain of definition within a feature value space in a storage unit;
setting a position of a projective point in a space whose dimension is higher by at least one dimension than a dimension of the feature value space and in which a sphere is present outside the feature value space, based on the information on a domain of definition within the feature value space stored in the storage unit, a domain in the feature value space to which the sphere is projected using the set position of the projective point being a part of the feature value space;
receiving biological information of a user via an input device;
projecting a first vector that represents the biological information of the user, is used as a query and is present in the domain of definition within the feature value space to the sphere by using the set position of the projective point;
generating a first bit string that is converted from the projected first vector; and
calculating a Hamming distance between the first bit string and each of a second plurality of bit strings that are each generated from other projected vectors of a second plurality of vectors for users that each represent biological information thereof, are registered in a storage unit, and present in the domain of definition within the feature value space, obtaining, from among the second plurality of vectors, vectors that are similar to the first vector, based on the calculated Hamming distance, and determining whether the first vector is registered in the storage unit to authenticate the user.

* * * * *